US010217571B2

(12) United States Patent
Xing

(10) Patent No.: US 10,217,571 B2
(45) Date of Patent: Feb. 26, 2019

(54) HIGH ENERGY DENSITY HYBRID PSEUDOCAPACITORS AND METHOD OF MAKING AND USING THE SAME

(71) Applicant: ADA Technologies, Inc., Littleton, CO (US)

(72) Inventor: Weibing Xing, Littleton, CO (US)

(73) Assignee: ADA TECHNOLOGIES, INC., Littleton, CO (US)

(*) Notice: Subject to any disclaimer, the term of this patent is extended or adjusted under 35 U.S.C. 154(b) by 116 days.

(21) Appl. No.: 15/162,234

(22) Filed: May 23, 2016

(65) Prior Publication Data

US 2017/0084401 A1 Mar. 23, 2017
US 2017/0213655 A9 Jul. 27, 2017

Related U.S. Application Data

(60) Provisional application No. 62/266,491, filed on Dec. 11, 2015, provisional application No. 62/199,631, (Continued)

(51) Int. Cl.
*H01G 9/00* (2006.01)
*H01G 9/02* (2006.01)
(Continued)

(52) U.S. Cl.
CPC .......... *H01G 11/32* (2013.01); *H01G 9/155* (2013.01); *H01G 11/46* (2013.01); *H01G 11/52* (2013.01);
(Continued)

(58) Field of Classification Search
CPC ........ H01G 11/36; H01G 11/04; H01G 11/26; H01G 11/32; H01G 11/86; H01G 11/46
(Continued)

(56) References Cited

U.S. PATENT DOCUMENTS 3,759,746 A 9/1973 McCallum
4,310,609 A 1/1982 Liang et al.
(Continued)

FOREIGN PATENT DOCUMENTS

EP 2613389 7/2013
WO WO 99/01902 1/1999
(Continued)

OTHER PUBLICATIONS

Donders et al. "Atomic Layer Deposition of LiCoO2 Thin-Film Electrodes for All-Solid-State Li-Ion Micro-Batteries," Journal of The Electrochemical Society, 2013, vol. 160, No. 5, pp. A3066-A3071.
(Continued)

*Primary Examiner* — Eric Thomas
*Assistant Examiner* — Arun Ramaswamy
(74) *Attorney, Agent, or Firm* — Sheridan Ross P.C.

(57) ABSTRACT

A hybrid electrochemical energy storage device having the attributes of a high power supercapacitor and a lithium ion battery are described. The hybrid electrochemical energy storage device can be a pseudocapacitor with a cathode having a coated activated carbon powder having a coated activated carbon cathode. The coated activated carbon can provide for enhanced energy density and ion conductivity. The activated carbon powder is coated with metal oxides, metal nitrides, metal sulfides, metal phosphates, polymers, and ion conducting or solid electrolytes, and a mixture thereof. More specifically, the activated carbon powder can include two or more active materials, with one of the two or more active materials being carbonaceous particles that comprise from about 50 to about 100 wt % of the composition, and the other of the two or more active materials atomic deposition layers on the carbonaceous particles. The atomic deposited layers can be metal oxides, metal nitrides,
(Continued)

metal sulfides, metal phosphates, polymers, and ion conducting or solid electrolytes, and a mixture thereof.

37 Claims, 16 Drawing Sheets

Related U.S. Application Data filed on Jul. 31, 2015, provisional application No. 62/165,059, filed on May 21, 2015.

(51) Int. Cl.

| | | |
|---|---|---|
| *H01M 6/04* | (2006.01) | |
| *H01G 9/04* | (2006.01) | |
| *H01G 9/145* | (2006.01) | |
| *H01G 11/32* | (2013.01) | |
| *H01M 12/00* | (2006.01) | |
| *H01G 11/46* | (2013.01) | |
| *H01G 11/52* | (2013.01) | |
| *H01G 11/56* | (2013.01) | |
| *H01G 11/60* | (2013.01) | |
| *H01G 11/62* | (2013.01) | |
| *H01G 11/66* | (2013.01) | |
| *H01G 11/86* | (2013.01) | |

(52) U.S. Cl.
CPC ............ *H01G 11/56* (2013.01); *H01G 11/60* (2013.01); *H01G 11/62* (2013.01); *H01G 11/66* (2013.01); *H01G 11/86* (2013.01); *H01M 12/005* (2013.01)

(58) Field of Classification Search
USPC .................................. 361/502, 504, 508, 516
See application file for complete search history.

(56) References Cited

U.S. PATENT DOCUMENTS

| | | |
|---|---|---|
| 4,681,823 A | 7/1987 | Tung et al. |
| 5,045,415 A | 9/1991 | Witehira |
| 5,557,497 A | 9/1996 | Ivanov et al. |
| 5,631,104 A | 5/1997 | Zhong et al. |
| 6,613,383 B1 | 9/2003 | George et al. |
| 6,713,177 B2 | 3/2004 | George et al. |
| 6,913,827 B2 | 7/2005 | George et al. |
| 6,958,174 B1 | 10/2005 | Klaus et al. |
| 7,026,070 B2 | 4/2006 | Noguchi et al. |
| 7,081,267 B2 | 7/2006 | Yadav |
| 7,081,367 B2 | 7/2006 | Shiraishi |
| 7,132,697 B2 | 11/2006 | Weimer et al. |
| 7,211,236 B2 | 5/2007 | Stark et al. |
| 7,396,862 B2 | 7/2008 | Weimer et al. |
| 7,413,982 B2 | 8/2008 | Levy |
| 7,426,067 B1 | 9/2008 | Bright et al. |
| 7,494,746 B2 | 2/2009 | Tarnopolsky |
| 7,553,686 B2 | 6/2009 | George et al. |
| 7,658,340 B2 | 2/2010 | Pfeffer et al. |
| 7,674,557 B2 | 3/2010 | Sun et al. |
| 7,790,317 B1 | 9/2010 | Poeppelmeier et al. |
| 7,833,437 B2 | 11/2010 | Fan et al. |
| 7,851,580 B2 | 12/2010 | Li et al. |
| 8,124,179 B2 | 2/2012 | Nilsen et al. |
| 8,133,462 B2 | 3/2012 | Jouanneau et al. |
| 8,133,531 B2 | 3/2012 | King et al. |
| 8,137,844 B2 | 3/2012 | Awano et al. |
| 8,163,336 B2 | 4/2012 | Weimer et al. |
| 8,187,731 B2 | 5/2012 | Weimer et al. |
| 8,439,283 B2 | 5/2013 | Pfeffer et al. |
| 8,531,090 B2 | 9/2013 | Spencer, II |
| 8,637,156 B2 | 1/2014 | Weimer et al. |
| 8,735,003 B2 | 5/2014 | Kim et al. |
| 8,785,030 B2 | 7/2014 | Ueda |
| 8,808,901 B2 | 8/2014 | Wang et al. |
| 8,894,723 B2 | 11/2014 | Nilsen et al. |
| 8,956,761 B2 | 2/2015 | Reynolds et al. |
| 8,993,051 B2 | 3/2015 | Kelder et al. |
| 9,005,816 B2 | 4/2015 | Amine et al. |
| 9,054,375 B2 | 6/2015 | Choi et al. |
| 9,059,451 B2 | 6/2015 | Xiao et al. |
| 9,093,707 B2 | 7/2015 | Lee et al. |
| 9,107,851 B2 | 8/2015 | Dave et al. |
| 9,243,330 B2 | 1/2016 | Granneman et al. |
| 9,246,164 B2 | 1/2016 | Lu et al. |
| 9,627,691 B2 | 4/2017 | Xing et al. |
| 9,755,235 B2 | 9/2017 | Xing |
| 9,887,421 B2 | 2/2018 | Xing et al. |
| 2001/0041294 A1 | 11/2001 | Chu et al. |
| 2002/0012844 A1 | 1/2002 | Gan et al. |
| 2003/0054250 A1 | 3/2003 | Kweon et al. |
| 2004/0194691 A1 | 10/2004 | George et al. |
| 2005/0238949 A1 | 10/2005 | Morris et al. |
| 2006/0115738 A1 | 6/2006 | Sazhin et al. |
| 2006/0269834 A1 | 11/2006 | West et al. |
| 2007/0212604 A1 | 9/2007 | Ovshinsky et al. |
| 2007/0275284 A1 | 11/2007 | Merritt et al. |
| 2007/0281089 A1 | 12/2007 | Heller et al. |
| 2009/0090640 A1 | 4/2009 | Jang et al. |
| 2009/0214927 A1 | 8/2009 | Dadheech et al. |
| 2010/0035152 A1 | 2/2010 | Sastry et al. |
| 2010/0109130 A1 | 5/2010 | Pinna et al. |
| 2010/0123993 A1 | 5/2010 | Laor |
| 2010/0178481 A1 | 7/2010 | George et al. |
| 2010/0273059 A1 | 10/2010 | Sano |
| 2010/0310908 A1 | 12/2010 | Zhang et al. |
| 2011/0027658 A1 | 2/2011 | Kim et al. |
| 2011/0149473 A1 | 6/2011 | Eilertsen et al. |
| 2011/0184482 A1 | 7/2011 | Eberman et al. |
| 2011/0236575 A1 | 9/2011 | King et al. |
| 2011/0311882 A1 | 12/2011 | Kim et al. |
| 2012/0053397 A1 | 3/2012 | Deegan et al. |
| 2012/0088164 A1 | 4/2012 | Foster et al. |
| 2012/0094213 A1 | 4/2012 | Ha et al. |
| 2012/0121932 A1 | 5/2012 | George et al. |
| 2012/0126182 A1 | 5/2012 | Zhang et al. |
| 2012/0145953 A1 | 6/2012 | Pallem et al. |
| 2012/0161456 A1 | 6/2012 | Riedmayr et al. |
| 2012/0293110 A1 | 11/2012 | Frederick et al. |
| 2012/0301778 A1 | 11/2012 | Trevey et al. |
| 2013/0045328 A1 | 2/2013 | Adzic et al. |
| 2013/0075647 A1 | 3/2013 | Gadkaree |
| 2013/0187618 A1 | 7/2013 | Suppes |
| 2013/0244063 A1 | 9/2013 | Dhar et al. |
| 2013/0260229 A1 | 10/2013 | Uzun et al. |
| 2014/0023932 A1 | 1/2014 | Zhang et al. |
| 2014/0093754 A1 | 4/2014 | Hamers et al. |
| 2014/0106186 A1 | 4/2014 | Dudney et al. |
| 2014/0162132 A1 | 6/2014 | Ishii et al. |
| 2014/0272578 A1 | 9/2014 | Xiao et al. |
| 2014/0328005 A1* | 11/2014 | Oh .................. H01G 11/32 361/502 |
| 2014/0340818 A1 | 11/2014 | Xie et al. |
| 2015/0037660 A1 | 2/2015 | Bedjaoui et al. |
| 2015/0064537 A1 | 3/2015 | Christensen et al. |
| 2015/0152549 A1 | 6/2015 | King et al. |
| 2015/0162606 A1 | 6/2015 | Kelder et al. |
| 2015/0180023 A1 | 6/2015 | Xiao et al. |
| 2015/0194701 A1 | 7/2015 | Kim et al. |
| 2015/0225853 A1 | 8/2015 | Mantymaki et al. |
| 2015/0270532 A1 | 9/2015 | Sastry et al. |
| 2015/0357650 A1 | 12/2015 | Lakshmanan et al. |
| 2017/0033371 A1 | 2/2017 | Cordova |
| 2017/0373318 A1 | 12/2017 | Xing |

FOREIGN PATENT DOCUMENTS

| | | |
|---|---|---|
| WO | WO 2011/098233 | 8/2011 |
| WO | WO 2013/011297 | 1/2013 |
| WO | WO 2015/030407 | 3/2015 |
| WO | WO 2015/106769 | 7/2015 |
| WO | WO 2015/153584 | 10/2015 |

(56) References Cited

FOREIGN PATENT DOCUMENTS

| WO | WO 2015/189284 | 12/2015 |
|---|---|---|
| WO | WO 2015/197589 | 12/2015 |
| WO | WO 2016/196445 | 12/2016 |

OTHER PUBLICATIONS

Xing, "Atomic Layer Deposition of Metal Oxides on Activated Carbons for High Energy Density and High Performance Supercapacitors," was submitted to 227th Electrochemical Society Meeting on Nov. 30, 2014, 2 pages.
International Search Report and Written Opinion for Internation (PCT) Patent Application No. PCT/US2016/033791, dated Jan. 19, 2017, 9 pages.
U.S. Appl. No. 15/660,772, filed Jul. 26, 2017, Xing.
U.S. Appl. No. 15/821,092, filed Nov. 22, 2017, Xing.
U.S. Appl. No. 15/928,840, filed Mar. 22, 2018, Xing.
"Lithium-air battery," retrieved from http://en.wikipedia.org/wiki/Lithium%E2%80%93air_battery, retrieved on May 26, 2015, 11 pages.
"Calendar life for ADA LNMO/li half cells," ADA Technologies, Inc., 2013, 3 pages.
"Long Life Battery for LEO Application," ADA Technologies, Inc., Proposal No. S3.03.04, 2012, 19 pages.
Ahn et al, "Extended Lithium Titanate Cycling Potential Window with Near Zero Capacity Loss," Electrochemistry Communications 13 (2011), pp. 796-799.
Aravindan et al. "Atomic layer deposited (ALD)SnO2 anodes with exceptional cycleability for Li-ion batteries," Nano Energy, Sep. 2013, vol. 2, No. 5, pp. 720-725.
Arrebola et al. "PMMA-assisted synthesis of Li1—xNi0.5Mn1.5O4-d for high-voltage lithium batteries with expanded rate capability at high cycling temperatures", Journal of Power Sources, Jun. 2008, vol. 180(2), pp. 852-858, 1 page, abstract only.
Ban et al., "Atomic layer deposition of amorphous TiO2 on graphene as an anode for Li-ion batteries," Nanotechnology, 2013, vol. 24, 424002, 6 pages.
Boukhalfa et al, "Atomic Layer Deposition of Vanadium Oxide on Carbon Nanotubes for High-Power Supercapacitor Electrodes", Energy & Environmental Science, 2012, vol. 5, pp. 6872-6879.
Beetstra et al., "Improved Li-ion Battery Performance by Coating Cathode Nano-Particles Using Atomic Layer Deposition," Refereed Proceedings of the 12th International Conference on Fluidization—New Horizons in Fluidization Engineering (2007) pp. 369-376.
Bloom, et al, "Effect of Interface Modifications on Voltage Fade in 0.5Li2MnO3-0.5LiNi0.375Co0.25)2, Cathode Materials," Journal of Power Sources, Mar. 2014, vol. 249, pp. 509-514.
Chemelewski et al., "Factors Influencing the Electrochemical Properties of High-Voltage Spinel Cathodes: Relative Impact of Morphology and Cation Ordering," Chem. Mater., 2013, vol. 25, pp. 2890-2897.
Cho et al., "Effect of Surface Modification on Nano-Structured LiNi0.5Mn1.5O4 Spinel Materials," ACS Applied Materials & Interfaces, Jul. 2015, vol. 7, No. 30, pp. 16231-16239 (Abstract Only).
Christensen et al., "A Critical Review of Li/Air Batteries," Journal of the Electrochemical Society, 2012, vol. 159(2), pp. R1-R30.
Dai et al., "Surface modified CFx cathode material for ultrafast discharge and high energy density," J. Mater. Chem. A, 2014, vol. 2, pp. 20896-20901, 1 page, abstract only.
Dobley et al., "High Capacity Cathodes for Lithium-Air Batteries," Yardney Technical Products, Inc./Lithion, Inc., 2004, 1 page.
Elam et al., "Viscous flow reactor with quartz crystal microbalance for thin film growth by atomic layer deposition," Review of Scientific Instruments, vol. 73(8), 2002, pp. 2981-2987.
Glass et al., "Lithium ion conduction in rapidly quenched Li2O—Al2O3, Li2O—Ga2O3, and Li2O—Bi2O3 glasses," Journal of Applied Physics, 1980, vol. 51(7), p. 3756, 1 page, abstract only.

Han et al., "Atomic-Layer-Deposition Oxide Nanoglue for Sodium Ion Batteries," Nano Letters, Nov. 2013, vol. 14, No. 1, pp. 139-147.
Hao et al., "Two-step hydrothermal synthesis of submicron Li1+XNi0.5Mn1.5O4-δ for lithium-ion battery cathodes (x=0.02, δ=0.12)," Dalton Trans., 2012, vol. 41, pp. 8067-8076.
He et al., "Alumina-Coated Patterned Amorphous Silicon as the Anode for a Lithium-Ion Battery with High Coulombic Efficiency," Advanced Materials, Nov. 2011, vol. 23, No. 42, pp. 4938-4941.
Hu et al., "Oxygen-Release-Related Thermal Stability and Decomposition Pathways of LixNi0.5Mn1.5O4 Cathode Materials," Chem. Mater., 2014, vol. 26, pp. 1108-1118.
Jung et al, "Effects of Atomic Layer Deposition of Al2O3 on the Li[Li 0.20Mn0.54Ni0.13]O2 Cathode for Lithium-Ion Batteries," Journal of the Electrochemical Society (2011), vol. 158, Issue 12, pp. A1298-A1302.
Jung et al, "Unexpected Improved Performance of ALO Coated LiCoO2/Graphite Li-ion Batteries," Advanced Energy Materials, Feb. 2013, vol. 3, No. 2, pp. 213-219.
Jung et al., "Enhanced Stability of LiCoO2 Cathodes in Lithium-Ion Batteries Using Surface Modification by Atomic Layer Deposition," Journal of the Electrochemical Society, 2010, vol. 157, No. 1, A75-A81.
Jung et al., "Enhanced Stability of LiCoO2 Cathodes in Lithium-ion Batteries Using Surface Modification by Atomic Layer Deposition," Journal of the Korean Ceramic Society (2010), vol. 47, No. 1, pp. 61-65.
Jung et al., "Ultrathin Direct Atomic Layer Deposition on Composite Electrodes for Highly Durable and Safe Li-Ion Batteries," Advanced Materials, May 2010, vol. 22, No. 19, pp. 2172-2176.
Kamaya et al. "A lithium superionic conductor," Nature Materials, Sep. 2011, vol. 10, pp. 682-686.
Kang et al., "Fe3O4 Nanoparticles Confined in Mesocellular Carbon Foam for High Performance Anode Materials for Lithium-Ion Batteries," Advanced Functional Materials, Jul. 2011, vol. 21, No. 13, pp. 2430-2438.
Kim et al., "Plasma-Enhanced Atomic Layer Deposition of Ultrathin Oxide Coatings for Stabilized Lithium-Sulfur Batteries," Advanced Energy Materials, Oct. 2013, vol. 3, No. 10, pp. 1308-1315.
Kim et al., "Unexpected High Power Performance of Atomic Layer Deposition Coated Li[Ni1/3Mn1/3C01/3]), Cathodes," Journal of Power Sources, May 2014, vol. 254, pp. 190-197.
Kunduraci et al., "High-Power Nanostructured LiMn2—xNixO4 High-Voltage Lithium-Ion Battery Electrode Materials: Electrochemical Impact of Electronic Conductivity and Morphology," Chem. Mater., 2006, vol. 18, pp. 3585-3592.
Kunduraci et al., "Synthesis and Characterizaton of Nanostructured 4.7 V LixMn1.5Ni0.5O4 Spinels for High-Power Lithium-Ion Batteries," J. The Electrochem. Soc., 2006, vol. 153(7), pp. A1345-A1352.
Lahiri et al., "Ultrathin alumina-coated carbon nanotubes as an anode for high capacity Li-ion batteries," Journal of Materials Chemistry, 2011, vol. 21, No. 35, pp. 13621-13626.
Lee et al, Atomic Layer Deposition of TiO2 on Negative Electrode for Lithium Ion Batteries,: Journal of Power Sources , Dec. 2013, vol. 244, pp. 410-416.
Lee et al, "Low-temperature Atomic Layer Deposited Al2O3 Thin Film on Layer Structure Cathode for Enhanced Cycleability in Lithium-ion Batteries," Electrochimica Acta 55 (2010), pp. 4002-4006.
Lee et al, "Roles of Surface Chemistry on Safety and Electrochemistry in Lithium Ion Batteries," Acc Chem Res, Apr. 2012, vol. 46, No. 5, pp. 1161-1170.
Lee et al., "The effect of TiO2 coating on the electrochemical performance of ZnO nanorod as the anode material for lithium-ion battery," Applied Physics A, Mar. 2011, vol. 102, No. 3, pp. 545-550.
Leung et al, "Using Atomic Layer Deposition to Hinder Solvent Decomposition in Lithium Ion Batteries: First-Principles Modeling and Experimental Studies," Journal of the American Chemical Society (2011), vol. 133, No. 37, pp. 14741-14754.
Li et al, "Artificial Solid Electrolyte Interphase to Address the Electrochemical Degradation of Silicon Electrodes," Applied Materials & Interfaces, Jun. 13, 2014, vol. 6, No. 13, pp. 10083-10088.

(56) References Cited

OTHER PUBLICATIONS

Li et al, "Synthesis Characterization and Electrochemical Performance of AlF3-coated Li1.2(Mn0.54Ni0.16Co0.08)O2 as Cathode for Li-ion Battery," Science Press, Trans. Nonferrous Met. Soc. China Nov. 2014, vol. 24, No. 11, pp. 3534-3540 (Abstract Only).
Li et al., "Significant impact on cathode performance lithium-ion batteries by precisely controlled metal oxide nanocoatings via atomic layer deposition," Journal of Power Sources, Feb. 2014, vol. 247, pp. 57-69.
Li et al., "The improved discharge performance of LiCFx batteries by using multi-walled carbon nanotubes as conductive additive," Journal of Power Sources, 2011, vol. 196, pp. 2246-2250.
Li et al., "Tin Oxide with Controlled Morphology and Crystallinity by Atomic Layer Deposition onto Graphene Nanosheets for Enhanced Lithium Storage," Advanced Functional Materials, Apr. 2012, vol. 22, No. 8, pp. 1647-1654.
Lin et al., "Chemical and Structural Stability of Lithium-Ion Battery Electrode Materials under Electron Beam," Scientific Reports, Jul. 16, 2014, vol. 4, 5694, 6 pages.
Liu et al, "Lithium-rich Li1.2Ni0.13Co0.13Mn0.54O2 oxide coated by Li3PO4 and carbon nanocomposite layers as high performance cathode materials for lithium ion batteries," Journal of Materials Chemistry A, 2015, vol. 3, No. 6, pp. 2634-2641 (Abstract Only).
Liu et al., "Rational Design of Atomic-Layer-Deposited LiFePO4 as a High-Performance Cathode for Lithium-Ion Batteries," Advanced Materials, vol. 26, No. 37, Oct. 8, 2014, pp. 6472-6477.
Liu et al., "Ultrathin atomic layer deposited ZrO2 coating to enhance the electrochemical performance of Li4 Ti5O12 as an anode material," Electrochimica Acta 93 (2013), pp. 195-201.
Lu et al, "Effectively Suppressing Dissolution of Manganese from Spinel Lithium Manganate via a Nanoscale Surface-doping Approach," Nature Communications, Dec. 16, 2014., No. 5, 5693, 8 pages.
Maeda et al., "Effect of deviation from Ni/Mn Stoichiometry in Li[Ni1/2Mn3/2]O4 upon rechargeable capacity at 4.7 V in nonaequeous lithium cells," J. Ceramic Soc. Of Japan, 2009, vol. 117(11), pp. 1216-1220.
Meng et al., "Emerging Applications of Atomic Layer Deposition for Lithium-Ion Battery Studies," Advanced Materials, Jul. 2012, vol. 24, No. 27, pp. 3589-3615.
Nanda, "Studies on Lithium Manganese Rich MNC Composite Cathodes," Oack Ridge National Laboratory, Project ID #E5106, May 16, 2013. 23 pages.
Oh, "Superior Long-Term Energy Retention and Volumetric Energy Density for Li-Rich Cathode Materials," Nano Letters, Sep. 2014, vol. 14, No. 10, pp. 5965-5972 (Abstract Only).
Piper et al., "Reversible High-Capacity Si Nanocomposite Anodes for Lithium-ion Batteries Enabled by Molecular Layer Deposition," 224th ECS Meeting, The Electrochemical Society, 2013, Abstract #954.
Ramasamy, et al., "Discharge characteristics of silver vanadium oxide cathodes," Journal of Applied Electrochemistry, 2006, vol. 36, pp. 487-497.
Rangasamy et al., "Pushing the Theoretical Limit of LiCFx Batteries: A tale of Bifunctional Electrolyte," Journal of the American Chemical Society, 2014, vol. 136, pp. 6874-6877.
Read, et al., "LiF Formation and Cathode Swelling in the Li/CFx Battery," Journal of The Electrochemical Society, 2011, vol. 158(5), pp. A504-A510, 1 page, abstract only.
Riley et al., "Electrochemical effects of ALD surface modification on combustion synthesized LiNi1/3Mn1/3O2 as a layered-cathode material," Journal of Power Sources, Mar. 2011, vol. 196, No. 6, pp. 3317-3324.
Sauvage, et al., "Room-Temperature Synthesis Leading to Nanocrystalline Ag2V4O11," J. Am. Chem. Soc., 2010, vol. 132(19), pp. 6778-6782.
Sun et al., "Atomic Layer Deposition of TiO2 on Graphene for Supercapacitors," Journal of The Electrochemical Society, 2012, vol. 159(4), pp. A364-A369.
Sun et al, "Pseudocapacitance of Amorphous TiO2 Thin Films Anchored to Graphene and Carbon Nanotubes Using Atomic Layer Deposition", The Journal of Physical Chemistry C, 2013, vol. 117 (44), pp. 22497-22508.
Takeuchi et al., "Reduction of Silver Vanadium Oxide in Lithium/Silver Vanadium Oxide Cells," Journal of the Electrochemical Society, Nov. 1988, vol. 135(11), pp. 2691-2694.
Unocic et al, "Direct Visualization of Solid Electrolyte Interphase Formation in Lithium-Ion Batteries with In Situ Electrochemical Transmission Electron Microscopy," Microscopy and Microanalysis, Aug. 2014, vol. 20, No. 4, pp. 1029-1037 (Abstract Only).
Wang et al, "Electrochemical Investigation of an Artificial Solid Electrolyte Interface for Improving the Cycle-ability of Lithium Ion Batteries using an Atomic Layer Deposition on a Graphite Electrode," Journal of Power Sources, Jul. 2013, vol. 233, pp. 1-5.
Wang, et al., "Determination of Chemical Diffusion Coefficient of Lithium Ion in Graphitized Mesocarbon Microbeads with Potential Relaxation Technique," Journal of The Electrochemical Society, 2001, vol. 148(7), pp. A737-A741, 1 page, abstract only.
Wei et al., "Effects of Ni Doping on [MnO6] Octahedron in LiMn2O4," J. Phys. Chem. B, 2004, vol. 108, pp. 18547-18551.
Wu et al., "An Alumina-Coated Fe3O4-Reduced Graphene Oxide Composite Electrode as a Stable Anode for Lithium-ion Battery," Electrochimica Acta, Feb. 2015, vol. 156, pp. 147-153 (Abstract Only).
Xiao et al, "Ultrathin Multifunctional Oxide Coatings for Lithium Ion Batteries," Advanced Materials, Sep. 2011, vol. 23, No. 34, pp. 3911-3915.
Xiao et al. "High-Performance LiNi0.5Mn1.5O4 Spinel Controlled by Mn3+ Concentration and Site Disorder", Advanced Materials, 2012, vol. 24(16), pp. 2109-2116, 2 pages, abstract only.
Xiao et al., "Unravelling the Role of Electrochemically Active FePO4 Coating by Atomic Layer Deposition for Increased High-Voltage Stability of LiNi0.5Mn1 O4 Cathode Material," Advanced Science, May 2015, vol. 2, No. 5, 1500022, 6 pages.
Xiao, "Atomic Layer Coating to Mitigate Capacity Fading Associated with Manganese Dissolution in Lithium Ion Batteries," Electrochemistry Communications, Jul. 2013, vol. 32, pp. 31-34.
Xie et al.
Xing et al., "High Performance LiNi0.5Mn1.5O4 Spinel Li-ion Battery Cathode Development," The Electrochemical Society, ECS Transations, 2013, 53(30), pp. 111-119, 9 pages.
Yesibolati et al., "SnO2 Anode Surface Passivation by Atomic Layer Deposited HfO2 Improves Li-Ion Battery Performance," Small, Jul. 2014, vol. 10, No. 14, pp. 2849-2858 (Abstract Only).
Yongli et al., "Electrochemical Performance Ni Doped Spinel LiMn2O4 Cathode for Lithium Ion Batteries," Adv. Materials Res., doi:10.4028/www.scientific.net/AMR.347-353.290, 2012, 12 pages.
Zhang et al., "Electrochemical characteristic and discharge mechanism of a primary Li/CFx cell," Journal of Power Sources, 2009, vol. 187(1), pp. 233-237, 1 page, abstract only.
Zhang et al., "Preparation, Characterization and Electrochemical Catalytic Properties of Hallandite Ag2Mn8O16 for Li-Air Batteries," Journal of the Electrochemical Society, 2012, vol. 159(3), pp. A310-A314.
Zhao et al., "Atomic layer deposition of epitaxial ZrO2 coating on LiMn2O4 nanoparticles for high-rate lithium ion batteries at elevated temperature," Nano Energy, Sep. 2013, vol. 2, No. 5, pp. 882-889.
Zheng et al, "Mitigating Voltage Fade in Cathode Materials by Improving the Atonic Level Uniformity of Elemental Distribution," Nano Letters, Apr. 2014, vol. 14, No. 5, pp. 2628-2635.
Zhong, "Lithium-Air Batteries: An Overview," Submitted as coursework for PH240, Stanford University, Dec. 3, 2011, 4 pages.
Zhou et al., "LiNi0.5Mn1.5O4 Hollow Structures as High-Performance Cathodes for Lithium-Ion Batteries," Angew. Chem. Int. Ed., 2012, vol. 51, pp. 239-241.
International Preliminary Report on Patentability for International (PCT) Patent Application No. PCT/US2016/033791, dated Nov. 30, 2017, 8 pages.
Official Action for U.S. Appl. No. 14/175,873, dated Oct. 7, 2015, 7 pages.
Final Action for U.S. Appl. No. 14/175,873, dated May 5, 2016, 6 pages.

(56) References Cited

OTHER PUBLICATIONS

Notice of Allowance for U.S. Appl. No. 14/175,873, dated Nov. 21, 2016, 8 pages.
Restriction Requirement for U.S. Appl. No. 14/606,932, dated Apr. 20, 2016, 7 pages.
Official Action for U.S. Appl. No. 14/606,932, dated Jul. 1, 2016, 22 pages.
Official Action for U.S. Appl. No. 14/606,932, dated Mar. 16, 2017, 15 pages.
Notice of Allowance for U.S. Appl. No. 14/606,932, dated Sep. 21, 2017, 11 pages.
Final Action for U.S. Appl. No. 15/660,772, dated Aug. 24, 2018, 7 pages.
Official Action for U.S. Appl. No. 14/802,805, dated Dec. 15, 2016, 8 pages.
Notice of Allowance for U.S. Appl. No. 14/802,805, dated Apr. 25, 2017, 7 pages.
U.S. Appl. No. 14/175,873, filed Feb. 7, 2014 now U.S. Pat. No. 9,627,691.
U.S. Appl. No. 14/606,932, filed Jan. 27, 2015 now U.S. Pat. No. 9,887,421.
U.S. Appl. No. 14/802,805, filed Jul. 17, 2015 now U.S. Pat. No. 9,755,235.
U.S. Appl. No. 15/679,979, filed Aug. 17, 2017.
U.S. Appl. No. 15/224,168, filed Jul. 29, 2016.
U.S. Appl. No. 15/660,772, filed Jul. 26, 2017.
U.S. Appl. No. 15/821,092, filed Nov. 22, 2017.
U.S. Appl. No. 15/928,840, filed Mar. 22, 2018.

* cited by examiner

PRISTINE ACTIVATED CARBON (AC2)
ELECTRODE SURFACE

AC2 ELECTRODE SURFACE, WITH
ALD DEPOSTITION OF $V_2O_5$ (296Å)

HIGH ENERGY DENSITY HYBRID PSEUDOCAPACITORS AND METHOD OF MAKING AND USING THE SAME

CROSS REFERENCE TO RELATED APPLICATIONS

The present application claims priority under 35 U.S.C. § 119 to U.S. Provisional Patent Application Nos. 62/165,059, which was filed May 21, 2015, entitled "Modified High Surface Area Carbons for High Energy Density, High Power Density and Long Cycle Life Pseudocapacitors," 62/199,631, which was filed Jul. 31, 2015, entitled "High Energy Density Hybrid Pseudocapacitors and Method of Making and Using the Same", each of which is incorporated in its entirety herein by this reference, and U.S. Provisional Patent Application No. 62/266,491, which was filed Dec. 11, 2015, entitled "High energy Density Hybrid Pseudocapacitors and Method of Making and Using the Same".

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. N39430-13-P-1248 to the Navy and FA9453-15-M-0493 to the Air Force.

BACKGROUND

Lithium ion batteries and ultracapacitors differ in their performance characteristics. Lithium ion batteries provide large specific energy while suffering from diminished power density, especially pulse power, temperature range, and operational and storage life. Meanwhile, ultracapacitors excel at providing high rate repetitive pulses across a wide temperature range with energy efficiencies near unity. Ultracapacitors have extremely high power densities and energy efficiencies due to their low internal resistance. Commercial ultracapacitors provide a specific energy of about 2 Wh/kg.

Rechargeable batteries involve several reactions throughout the structure, such as chemical processes that are highly reversible, but relatively slow (specifically bulk diffusion). Rechargeable batteries generally have a slight capacity loss due to parasitic side reactions that increase impedance and limit power and cycle life. Further, they often require waste heat management to maintain safety and cycle life.

Ultracapacitors (also known as supercapacitors or electric double-layer capacitors) are less prone to safety, thermal management and cycle life limitations that plague even the highest power rated batteries. For example, the majority of high power lithium ion batteries require thermal management systems to maintain their initial performance, prevent premature failure and potential catastrophic deflagration, resulting in severe safety concerns. Meanwhile, ultracapacitors can tolerate many more charge and discharge cycles, operate across a wider temperature range and are much safer than the most advanced battery chemistries.

Ultracapacitors can combine an electrostatic double layer capacitance with electrochemical pseudocapacitance and are about 10 to about 100 times the energy of an electrolytic capacitor. Ultracapacitors can access much more capacitance than an electrolytic capacitor due to fundamental differences in their internal structure. Instead of having two electrodes separated by an insulating layer like an electrolytic capacitor, an ultracapacitor employs a porous medium that significantly increases the serviceable surface area while not significantly increasing the charge separation between electrodes.

Electrostatic double layer capacitors store electrical energy by separation of charge in the Helmholtz double layer at the surface of a porous electrode and electrolytic solution. The charge separation distance in a double-layer is on the order of a few Ångstroms (from about 0.3 to about 0.8 nm) and is static in origin. The electrolyte serves as a conductive connection between the two active electrodes.

Electrochemical pseudocapacitors store electrical energy electrochemically through faradic redox reactions on the surface of suitable electrodes in an electrochemical capacitor. The reaction involves an electron charge transfer between the electrode and electrolyte along with a desolvated and absorbed ion. The faradic charge transfer is a rapid, highly reversible redox reaction that is very stable over time involving an absorption or intercalation process that does not involve the forming or breaking of chemical bonds. The faradic pseudocapacitance only occurs in tandem with an electrostatic double layer capacitance. The amount of pseudocapacitance depends on the electrode surface area, material and structure.

Pseudocapacitance is dependent upon the chemical affinity of electrode materials to the ions adsorbed on the electrode surface as well as on the structure and dimension of the electrode pores. The conductive electrode, often a high surface area carbon-based material (such as activated carbon) is commonly doped with transition-metal oxides to allow for pseudocapacitance. A number of transition metal oxides have been studied as alternative electrodes, using various techniques and baseline materials (substrates), such as, $Co_3O_4$ thin films prepared by sputtering or $Co_3O_4$ thin film on carbon fiber by hydrothermal synthesis, $MnO_x$ on carbon nanotubes by electrodeposition, NiO thin films by electrochemical precipitation, and $TiO_2$ thin films by wet chemical method. Large pseudocapacitance, e.g., greater than about 1100 F/g (hydrothermal $Co_3O_4$ thin film on carbon fiber), was reported, along with good rate capability and cycle life for these materials. Alternatively, electrically conductive polymers such as polyaniline or derivatives of polythiophene have also been used to coat the electrode material. Pseudocapacitance may also originate from the structure, especially from the electrode pores. The pores in nano-structured carbons like carbide-derived carbons or carbon nano-tubes can be referred to as intercalated pores which can be entered by desolvated ions from the electrolyte solution. The occupation of these pores by de-solvated ions has been found to occur via faradic intercalations.

SUMMARY

These and other needs are addressed by the present disclosure. Aspects of the present disclosure can have advantages over current practices. A number of variations and modifications of the disclosure can be used. It would be possible to provide for some features of the disclosure without providing others. In accordance with some embodiments of the present disclosure are supercapacitors, and particularly asymmetric supercapacitors. These can include a cathode (a first electrode) that functions like a battery, in that it can be combined with an anode (a second electrode) that functions as a capacitor/supercapacitor. One advantage of an asymmetric supercapacitor design is the relatively high voltage and corresponding higher specific energy. Commonly, the first electrode (cathode) can be based on metal oxides and the negative electrode (anode) on activated carbon (e.g., NiOOH//KOH//activated carbon or $PbO_2$//$H_2SO_4$//activated carbon). The upper specific energy range for commercial asymmetric supercapacitor is commonly about 20 Wh/kg.

Lithium ion capacitors are a type of hybrid supercapacitor that combine the intercalation mechanism of a lithium ion battery with a lithiated graphitic anode and a supercapacitor based on activated carbon cathode. The electrolyte typically employs a lithium containing salt in a carbonate containing solvent, similar to those utilized in lithium ion batteries. The graphitic anode can be pre-lithiated (or doped) with lithium. The pre-lithiated graphite anode can increase the cell upper voltage to about 3.8V. Lithium ion capacitors can take advantage of a large capacity lithium ion containing anode and a high rate capacitor cathode. However, lithium-ion capacitors are often limited in capacity by the cathode even though the voltage is increased. A hybrid electrochemical energy storage device can have the attributes of a high power supercapacitor and a lithium ion battery.

In accordance with some embodiment of the present disclosure is a pseudocapacitor with a cathode having a coated activated carbon powder. Pseudocapacitors having a coated activated carbon cathode can have an enhanced energy density and ion conductivity. In some embodiments, the activated carbon powder is coated with a metal oxide.

In accordance with some embodiments is a composition that can include two or more active materials, where one of the two or more active materials can be carbonaceous particles and where the other of the two or more active materials can be atomic deposition layers on the carbonaceous particles. The carbonaceous particles can be from about 50 to about 100 wt % of the composition. The composition can have from about 50 to about 100 wt % of the carbonaceous particles. Generally, the composition can be in the form of a powder. In some embodiments, the carbonaceous particles can have an average surface area of about 50 $m^2$/g or more. Typically, the two or more active materials can be selected from the group consisting essentially of metal oxides, metal nitrides, metal sulfides, metal phosphates, polymers, and ion conducting or solid electrolytes, and a mixture thereof. In some embodiments, the atomic deposition layers have been deposited on the carbonaceous particles consecutively. Generally, each of the other of the two or more active materials can have an average particle size no larger than the average particle size of the carbonaceous particles. Typically, the carbonaceous particles have an average particle size from about 0.1 to about 100 μm. In some embodiments, each of the other of two or more active materials can have an average particle size from about 0.5 nm to about 10 μm.

In some embodiments of the composition, at least one of the other of the two or more active materials can be a metal oxide. Generally, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof.

In some embodiments of the composition, at least one of the other of the two or more active materials can be a metal nitride. Usually, the metal nitride can be selected from the group consisting essentially of $MnF_2$, $FeF_3$, $CoF_2$, $NiF_2$, $CuF_2$, CsF, LiF, KF, RbF, NaF, $CaF_2$, $SrF_2$, $BaF_2$, and a mixture thereof.

In some embodiments of the composition, at least one of the other of the two or more active materials can be a metal sulfide. Typically, the metal sulfide can be selected from the group consisting essentially of PbS, ZnS, CaS, BaS, SrS, $Cu_xS$, CdS, $In_2S_3$, $WS_2$, $TiS_2$, $Sb_2S_3$, SnS, $GaS_x$, GeS, $MoS_2$, and $Li_2S$, and a mixture thereof.

In some embodiments of the composition, at least one of the other of the two or more active materials can be a metal phosphate. Commonly, the metal phosphate can be selected from the group consisting essentially of a phosphate, hydrogen phosphate, di-hydrogen phosphate of an alkali metal phosphate, an alkaline earth metal phosphate, $AlPO_4$, $TiPO_4$, $FeAlPO_4$, $SiAlPO_4$, $CoAlPO_4$ $MnAlPO_4$, $Li_3PO_4$, $NaH_2PO_4$, and a mixture thereof.

In some embodiments of the composition, at least one of the other of the two or more active materials can be a polymer. Typically, the polymer can be selected from group consisting essentially of a polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof.

In some embodiments of the composition, the other of the two or more active materials can have the other of two or more active materials can be atomic deposition layers stacked one on top of the other, arranged side by side or a combination of stacked one on top of the other and side by side on the carbonaceous particles. In some embodiments of the composition, the other of the two or more active materials can have atomic deposition layers stacked one on top of the other, arranged side by side or a combination of stacked one on top of the other and side by side on the carbonaceous particles.

In some embodiments, the composition can have at least one of the other of the two or more active materials can be a functional material. The functional material can be selected from metal oxides, metal nitrides, metal sulfides, metal phosphates, polymers, and ion conducting or solid electrolytes, or a mixture thereof. The functional material can be an ion conducting material or a solid electrolyte. The ion conducting or solid electrolyte can be selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof.

In accordance with some embodiments is an electrochemical energy storage device having a first electrode, a second electrode, an electrolyte in ionic contact with the first electrode and the second electrode, and a separator positioned between the first and second electrodes and in ionic contact with the electrolyte.

Generally, the first electrode can include a first current collector, a first composition, a first plurality of conductive carbon particles, and a first polymeric binder. The first composition typically includes two or more first active materials, where one of the two or more first active materials can be a first plurality of carbonaceous particles and where the two or more first active materials can be a first set of atomic deposition layers on the first plurality of the carbonaceous particles. Generally, the first plurality of carbonaceous particles can be from about 50 to about 100 wt % of the first composition. More generally, the first composition can have from about 50 to about 100 wt % of the first plurality of carbonaceous particles. In some embodiments, the first polymeric binder, the first plurality of conductive particles and the first composition can be adhered to the first current collector.

In some embodiments, the second electrode can include a second current collector, a second plurality of conductive carbon particles, and a second polymeric binder. Commonly, the second polymeric binder and the second plurality of the conductive carbon particles are adhered to the second current collector.

In some embodiments of the electrochemical storage device, the second electrode can include a second composition. Typically, the second composition can have two or more second active materials. Generally, one of the two or more second active materials can be a second plurality of carbonaceous particles and the other of the two or more second active materials can have atomic deposition layers on the second plurality of carbonaceous particles. Usually, the second plurality of carbonaceous particles can be from about 50 to about 100 wt % of the second composition. More usually, the second composition can have from about 50 to about 100 wt % of the second plurality of carbonaceous particles. In some embodiments of the electrochemical storage device, the first and second compositions can be different. In some embodiments, the other of the two or more second active materials and the other of the two or more first active materials can be different. Commonly, each of the other of the two or more second active materials can be selected from the group consisting essentially of metal oxides, metal nitrides, metal sulfides, metal phosphates, polymers, and ion conducting or solid electrolytes, and a mixture thereof. Typically, at least one of the other of the two or more second active materials can be a functional material. More typically, the functional material can be selected from metal oxides, metal nitrides, metal sulfides, metal phosphates, polymers, and ion conducting or solid electrolytes, or a mixture thereof. Even more typically, the ion conducting material or a solid electrolyte can be elected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof. In some embodiments, the second set of atomic deposition layers has been deposited on the second plurality of carbonaceous particles consecutively. In some embodiments, each of the other of the two or more second active materials can have an average particle size no larger than the average particle size of the carbonaceous particles. Commonly, the first plurality of carbonaceous particles can have an average particle size from about 0.1 to about 100 μm. More commonly, each of the other of two or more second active materials can have an average particle size from about 0.5 nm to about 10 μm. In some embodiments, at least one of the other of the second two or more active materials can be a metal oxide. Commonly, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof. In some embodiments, at least one of the other of the two or more second active materials can be a metal nitride. Typically, the metal nitride can be selected from the group consisting essentially of $MnF_2$, $FeF_3$, $CoF_2$, $NiF_2$, $CuF_2$, CsF, LiF, KF, RbF, NaF, $CaF_2$, $SrF_2$, $BaF_2$, and a mixture thereof. In some embodiments, at least one of the other of the two or more second active materials can be a metal sulfide. Usually, the metal sulfide can be selected from the group consisting essentially of PbS, ZnS, CaS, BaS, SrS, $Cu_xS$, CdS, $In_2S_3$, $TiS_2$, $Sb_2S_3$, SnS, $GaS_x$, GeS, $MoS_2$, and $Li_2S$, and a mixture thereof. In some embodiments, at least one of the other of the two or more second active materials can be a metal phosphate. Commonly, the metal phosphate can be selected from the group consisting essentially of a phosphate, hydrogen phosphate, di-hydrogen phosphate of an alkali metal phosphate, an alkaline earth metal phosphate, $AlPO_4$, $TiPO_4$, $FeAlPO_4$, $SiAlPO_4$, $CoAlPO_4$, $MnAlPO_4$, $Li_3PO_4$, $NaH_2PO_4$, and a mixture thereof. In some embodiments, at least one of the other of the two or more second active materials can be a polymer. Generally, the polymer can be selected from group consisting essentially of a polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof. In some embodiments, each of the first and second carbonaceous particles can have an average surface area of about 50 $m^2/g$ or more. In some embodiments, each of the other of the two or more first active materials can be selected from the group consisting essentially of metal oxides, metal nitrides, metal sulfides, metal phosphates, polymers, and ion conducting or solid electrolytes, and a mixture thereof.

In some embodiments, at least one of the other of the two or more first active materials can be a functional material. Generally, the functional material can be selected from metal oxides, metal nitrides, metal sulfides, metal phosphates, polymers, and ion conducting or solid electrolytes, or a mixture thereof. Typically, the ion conducting material or a solid electrolyte can be selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof.

In some embodiments, the first set of atomic deposition layers has been deposited on the first plurality of carbonaceous particles consecutively.

In some embodiments, each of the other of the two or more first active materials can have an average particle size no larger than the average particle size of the first plurality carbonaceous particles.

In some embodiments, the first plurality of carbonaceous particles has an average particle size from about 0.1 to about 100 μm. Typically, each of the other of two or more first active materials can have an average particle size from about 0.5 nm to about 10 μm.

Generally, at least one of the other of the two or more first active materials can be a metal oxide. More generally, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof.

Typically, at least one of the other of the two or more first active materials can be a metal nitride. More typically, the metal nitride can be selected from the group consisting essentially of $MnF_2$, $FeF_3$, $CoF_2$, $NiF_2$, $CuF_2$, CsF, LiF, KF, RbF, NaF, $CaF_2$, $SrF_2$, $BaF_2$, and a mixture thereof.

Commonly, at least one of the other of the two or more first active materials can be a metal sulfide. More commonly, the metal sulfide can be selected from the group consisting essentially of PbS, ZnS, CaS, BaS, SrS, $Cu_xS$, CdS, $In_2S_3$, $WS_2$, $TiS_2$, $Sb_2S_3$, SnS, $GaS_x$, GeS, $MoS_2$, and $Li_2S$, and a mixture thereof.

Usually, at least one of the other of the two or more first active materials can be a metal phosphate. More usually, the metal phosphate can be selected from the group consisting essentially of a phosphate, hydrogen phosphate, di-hydrogen phosphate of an alkali metal phosphate, an alkaline earth metal phosphate, $AlPO_4$, $TiPO_4$, $FeAlPO_4$, $SiAlPO_4$, $CoAlPO_4$ $MnAlPO_4$, $Li_3PO_4$, $NaH_2PO_4$, and a mixture thereof.

Commonly, at least one of the other of the two or more first active materials can be a polymer. More commonly, the polymer can be selected from group consisting essentially of a polyimide, poly(fluorene), polyphenylenes, polypyrenes, polyazulene, polynaphthalenes, poly(acetylene) (PAC), poly (p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof.

In some embodiments, the electrolyte can be selected the group consisting essentially of an aqueous electrolyte, a non-aqueous electrolyte, an aprotic organic liquid electrolyte, a room temperature ionic liquid electrolyte, a polymeric electrolyte, a polymeric gel electrolyte, a solid state electrolyte, or a mixture thereof. Typically, the aprotic organic liquid electrolyte can be an electrolyte salt and an aprotic organic solvent. More typically, the electrolyte salt can be selected from, but not limited to, the group of quaternary salt consisting of tetraethylammonium tetrafluoroborate, triethylmethylammonium tetrafluoroborate, spirobipyrrolidinium tetrafluoroborate, or a mixture thereof. Even more typically, the aprotic organic solvent can be selected from the group consisting of nitrile, carbonate, ester, ether, sulfone, acetal, or a mixture thereof. In some embodiments, the electrolyte further include an additive selected from the group consisting essentially of vinylene carbonate, fluoroethylene carbonate, and a mixture thereof.

In accordance with some embodiments is an electrochemical energy storage device having a first electrode, a second electrode, an electrolyte in ionic contact with the first electrode and the second electrode, and a separator positioned between the first and second electrodes and in ionic contact with the electrolyte. In some embodiments the first electrode can include a first current collector, a first composition, first plurality of conductive carbon particles, and a first polymeric binder. Generally, the first polymeric binder can adhere the first plurality of conductive particles and the first composition to the first current collector. More generally, the first polymeric binder, the first plurality of conductive particles and the first composition can be adhered to first current collector. In some embodiments, the first composition can include two or more first active materials, where one of the first active materials can be a first plurality of carbonaceous particles, and where the other of the two or more first active materials can be a first set of atomic deposition layers on the first plurality of the carbonaceous particles. Commonly, the first plurality of carbonaceous particles can be from about 50 to about 100 wt % of the first composition. More commonly, the first composition can have from about 50 to about 100 wt % of the first plurality of carbonaceous particles. In some embodiments the second electrode can include a second current collector, a second composition, second plurality of conductive carbon particles, and a second polymeric binder. Generally, the second polymeric binder can adhere the second plurality of conductive particles and the second composition to the second current collector. More generally, the second polymeric binder, the second plurality of conductive particles and second composition can be adhered to second current collector. In some embodiments, the second composition can include two or more second active materials, where one of the second active materials can be a second plurality of carbonaceous particles, and where the other of the two or more second active materials can be a second set of atomic deposition layers on the second plurality of the carbonaceous particles. Commonly, the second plurality of carbonaceous particles can be from about 50 to about 100 wt % of the second composition. More commonly, the second composition can have from about 50 to about 100 wt % of the second plurality of carbonaceous particles. Generally, each of the first and second carbonaceous particles can have an average surface area of about 50 $m^2/g$ or more. Typically, at least one of the other of the two or more first active materials can be a functional material. More typically, the functional material can be selected from metal oxides, metal nitrides, metal sulfides, metal phosphates, polymers, and ion conducting or solid electrolytes, or a mixture thereof. Even more typically, the ion conducting material or a solid electrolyte can be selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof. Generally, the first set of atomic deposition layers can be deposited on the first plurality of carbonaceous particles consecutively. Commonly, at least one of the other of the two or more first active materials can be a metal oxide. More commonly, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, and a mixture thereof. Typically, the electrolyte can be selected the group consisting essentially of an aqueous electrolyte, a non-aqueous electrolyte, an aprotic organic liquid electrolyte, a room temperature ionic liquid electrolyte, a polymeric electrolyte, a polymeric gel electrolyte, a solid state electrolyte, or a mixture thereof. More typically, the aprotic organic liquid electrolyte can be an electrolyte salt and an aprotic organic solvent. Even more typically, the electrolyte salt can be a quaternary salt. Yet even more typically, the quaternary salt can be selected from the group consisting essentially of tetraethylammonium tetrafluoroborate, triethylmethylammonium tetrafluoroborate, spirobipyrrolidinium tetrafluoroborate, or a mixture thereof. In some embodiments, the aprotic organic solvent can be selected from the group consisting essentially of nitrile, carbonate, ester, ether, sulfone, acetal, or a mixture thereof. In some embodiments, the electrolyte further can be an additive selected from the group consisting essentially of vinylene carbonate, fluoroethylene carbonate, and a mixture thereof.

In accordance with some embodiments is an electrochemical energy storage device having a first electrode, a second electrode, an electrolyte in ionic contact with the first electrode and the second electrode, and a separator positioned between the first and second electrodes and in ionic contact with the electrolyte.

Generally, the first electrode can include a first current collector, a first composition, a first plurality of conductive carbon particles, and a first polymeric binder. The first composition typically includes two or more first active materials, where one of the two or more first active materials can be a first plurality of carbonaceous particles and where the two or more first active materials can be a first set of atomic deposition layers on one or more of the first plurality of conductive carbon particles and the first plurality of the carbonaceous particles. Generally, the first plurality of carbonaceous particles can be from about 50 to about 100 wt % of the first composition. More generally, the first composition can have from about 50 to about 100 wt % of the first plurality of carbonaceous particles. In some embodiments, the first polymeric binder, the first plurality of conductive particles and the first composition can be adhered to the first current collector.

In some embodiments, the second electrode can include a second current collector, a second plurality of conductive carbon particles, and a second polymeric binder. Commonly, the second polymeric binder and the second plurality of the conductive carbon particles are adhered to the second current collector.

In some embodiments of the electrochemical storage device, the second electrode can include a second composition. Typically, the second composition can have two or more second active materials. Generally, one of the two or more second active materials can be a second plurality of carbonaceous particles and the other of the two or more second active materials can have atomic deposition layers on the second plurality of conductive carbon particles and the second plurality of carbonaceous particles. Usually, the second plurality of carbonaceous particles can be from about 50 to about 100 wt % of the second composition. More usually, the second composition can have from about 50 to about 100 wt % of the second plurality of carbonaceous particles. In some embodiments of the electrochemical storage device, the first and second compositions can be different. In some embodiments, the other of the two or more second active materials and the other of the two or more first active materials can be different. Commonly, each of the other of the two or more second active materials can be selected from the group consisting essentially of metal oxides, metal nitrides, metal sulfides, metal phosphates, polymers, and ion conducting or solid electrolytes, and a mixture thereof. Typically, at least one of the other of the two or more second active materials can be a functional material. More typically, the functional material can be selected from metal oxides, metal nitrides, metal sulfides, metal phosphates, polymers, and ion conducting or solid electrolytes, or a mixture thereof. Even more typically, the ion conducting material or a solid electrolyte can be elected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof. In some embodiments, the second set of atomic deposition layers has been deposited on the second plurality of carbonaceous particles consecutively. In some embodiments, each of the other of the two or more second active materials can have an average particle size no larger than the average particle size of the carbonaceous particles. Commonly, the first plurality of carbonaceous particles can have an average particle size from about 0.1 to about 100 μm. More commonly, each of the other of two or more second active materials can have an average particle size from about 0.5 nm to about 10 μm. In some embodiments, at least one of the other of the second two or more active materials can be a metal oxide. Commonly, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof. In some embodiments, at least one of the other of the two or more second active materials can be a metal nitride. Typically, the metal nitride can be selected from the group consisting essentially of $MnF_2$, $FeF_3$, $CoF_2$, $NiF_2$, $CuF_2$, CsF, LiF, KF, RbF, NaF, $CaF_2$, $SrF_2$, $BaF_2$, and a mixture thereof. In some embodiments, at least one of the other of the two or more second active materials can be a metal sulfide. Usually, the metal sulfide can be selected from the group consisting essentially of PbS, ZnS, CaS, BaS, SrS, $Cu_xS$, CdS, $In_2S_3$, $W3_2$, $TiS_2$, $Sb_2S_3$, SnS, $GaS_x$, GeS, $MoS_2$, and $Li_2S$, and a mixture thereof. In some embodiments, at least one of the other of the two or more second active materials can be a metal phosphate. Commonly, the metal phosphate can be selected from the group consisting essentially of a phosphate, hydrogen phosphate, di-hydrogen phosphate of an alkali metal phosphate, an alkaline earth metal phosphate, $AlPO_4$, $TiPO_4$, $FeAlPO_4$, $SiAlPO_4$, $CoAlPO_4$ $MnAlPO_4$, $Li_3PO_4$, $NaH_2PO_4$, and a mixture thereof. In some embodiments, at least one of the other of the two or more second active materials can be a polymer. Generally, the polymer can be selected from group consisting essentially of a polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof. In some embodiments, each of the first and second carbonaceous particles can have an average surface area of about 50 $m^2/g$ or more. In some embodiments, each of the other of the two or more first active materials can be selected from the group consisting essentially of metal oxides, metal nitrides, metal sulfides, metal phosphates, polymers, and ion conducting or solid electrolytes, and a mixture thereof.

In some embodiments, at least one of the other of the two or more first active materials can be a functional material. Generally, the functional material can be selected from metal oxides, metal nitrides, metal sulfides, metal phosphates, polymers, and ion conducting or solid electrolytes, or a mixture thereof. Typically, the ion conducting material or a solid electrolyte can be selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof.

In some embodiments, the first set of atomic deposition layers has been deposited on the first plurality of carbonaceous particles consecutively. In some embodiments, the first set of atomic deposition layers has been deposited on one or more of the first plurality of conductive carbon particles and the first plurality of carbonaceous particles consecutively.

In some embodiments, each of the other of the two or more first active materials can have an average particle size no larger than the average particle size of the first plurality carbonaceous particles.

In some embodiments, the first plurality of carbonaceous particles has an average particle size from about 0.1 to about 100 μm. Typically, each of the other of two or more first active materials can have an average particle size from about 0.5 nm to about 10 μm.

Generally, at least one of the other of the two or more first active materials can be a metal oxide. More generally, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof.

Typically, at least one of the other of the two or more first active materials can be a metal nitride. More typically, the metal nitride can be selected from the group consisting essentially of $MnF_2$, $FeF_3$, $CoF_2$, $NiF_2$, $CuF_2$, CsF, LiF, KF, RbF, NaF, $CaF_2$, $SrF_2$, $BaF_2$, and a mixture thereof.

Commonly, at least one of the other of the two or more first active materials can be a metal sulfide. More commonly, the metal sulfide can be selected from the group consisting essentially of PbS, ZnS, CaS, BaS, SrS, $Cu_xS$, CdS, $In_2S_3$, $WS_2$, $TiS_2$, $Sb_2S_3$, SnS, $GaS_x$, GeS, $MoS_2$, and $Li_2S$, and a mixture thereof.

Usually, at least one of the other of the two or more first active materials can be a metal phosphate. More usually, the metal phosphate can be selected from the group consisting essentially of a phosphate, hydrogen phosphate, di-hydrogen phosphate of an alkali metal phosphate, an alkaline earth metal phosphate, $AlPO_4$, $TiPO_4$, $FeAlPO_4$, $SiAlPO_4$, $CoAlPO_4$ $MnAlPO_4$, $Li_3PO_4$, $NaH_2PO_4$, and a mixture thereof.

Commonly, at least one of the other of the two or more first active materials can be a polymer. More commonly, the polymer can be selected from group consisting essentially of a polyimide, poly(fluorene), polyphenylenes, polypyrenes, polyazulene, polynaphthalenes, poly(acetylene) (PAC), poly (p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof.

In some embodiments, the electrolyte can be selected the group consisting essentially of an aqueous electrolyte, a non-aqueous electrolyte, an aprotic organic liquid electrolyte, a room temperature ionic liquid electrolyte, a polymeric electrolyte, a polymeric gel electrolyte, a solid state electrolyte, or a mixture thereof. Typically, the aprotic organic liquid electrolyte can be an electrolyte salt and an aprotic organic solvent. More typically, the electrolyte salt can be selected from, but not limited to, the group of quaternary salt consisting of tetraethylammonium tetrafluoroborate, triethylmethylammonium tetrafluoroborate, spirobipyrrolidinium tetrafluoroborate, or a mixture thereof. Even more typically, the aprotic organic solvent can be selected from the group consisting of nitrile, carbonate, ester, ether, sulfone, acetal, or a mixture thereof. In some embodiments, the electrolyte further include an additive selected from the group consisting essentially of vinylene carbonate, fluoroethylene carbonate, and a mixture thereof.

In accordance with some embodiments is an electrochemical energy storage device having a first electrode, a second electrode, an electrolyte in ionic contact with the first electrode and the second electrode, and a separator positioned between the first and second electrodes and in ionic contact with the electrolyte. In some embodiments the first electrode can include a first current collector, a first composition, first plurality of conductive carbon particles, and a first polymeric binder. Generally, the first polymeric binder can adhere the first plurality of conductive particles and the first composition to the first current collector. More generally, the first polymeric binder, the first plurality of conductive particles and the first composition can be adhered to first current collector. In some embodiments, the first composition can include two or more first active materials, where one of the first active materials can be a first plurality of carbonaceous particles, and where the other of the two or more first active materials can be a first set of atomic deposition layers on one or more of the first plurality of conductive particles and the first plurality of the carbonaceous particles. Commonly, the first plurality of carbonaceous particles can be from about 50 to about 100 wt % of the first composition. More commonly, the first composition can have from about 50 to about 100 wt % of the first plurality of carbonaceous particles. In some embodiments the second electrode can include a second current collector, a second composition, second plurality of conductive carbon particles, and a second polymeric binder. Generally, the second polymeric binder can adhere the second plurality of conductive particles and the second composition to the second current collector. More generally, the second polymeric binder, the second plurality of conductive particles and second composition can be adhered to second current collector. In some embodiments, the second composition can include two or more second active materials, where one of the second active materials can be a second plurality of carbonaceous particles, and where the other of the two or more second active materials can be a second set of atomic deposition layers on one or more of the second plurality of conductive particles and the second plurality of the carbonaceous particles. Commonly, the second plurality of carbonaceous particles can be from about 50 to about 100 wt % of the second composition. More commonly, the second composition can have from about 50 to about 100 wt % of the second plurality of carbonaceous particles. Generally, each of the first and second carbonaceous particles can have an average surface area of about 50 $m^2/g$ or more. Typically, at least one of the other of the two or more first active materials can be a functional material. More typically, the functional material can be selected from metal oxides, metal nitrides, metal sulfides, metal phosphates, polymers, and ion conducting or solid electrolytes, or a mixture thereof. Even more typically, the ion conducting material or a solid electrolyte can be selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof. Generally, the first set of atomic deposition layers can be deposited on the first plurality of carbonaceous particles consecutively. Commonly, at least one of the other of the two or more first active materials can be a metal oxide. More commonly, the metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof. Typically, the electrolyte can be selected the group consisting essentially of an aqueous electrolyte, a non-aqueous electrolyte, an aprotic organic liquid electrolyte, a room temperature ionic liquid electrolyte, a polymeric electrolyte, a polymeric gel electrolyte, a solid state electrolyte, or a mixture thereof. More typically, the aprotic organic liquid electrolyte can be an electrolyte salt and an aprotic organic solvent. Even more typically, the electrolyte salt can be a quaternary salt. Yet even more typically, the quaternary salt can be selected from the group consisting essentially of tetraethylammonium tetrafluoroborate, triethylmethylammonium tetrafluoroborate, spirobipyrrolidinium tetrafluoroborate, or a mixture thereof. In some embodiments, the aprotic organic solvent can be selected from the group consisting essentially of nitrile, carbonate, ester, ether, sulfone, acetal, or a mixture thereof. In some embodiments, the electrolyte further can be an additive selected from the group consisting essentially of vinylene carbonate, fluoroethylene carbonate, and a mixture thereof.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_0$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

BRIEF DESCRIPTION OF THE DRAWINGS

The accompanying drawings, which are incorporated in and constitute a part of the specification, illustrate embodiments of the disclosure and together with the general description of the disclosure given above and the detailed description given below, serve to explain the principles of the disclosure.

DETAILED DESCRIPTION

Figure 1A:
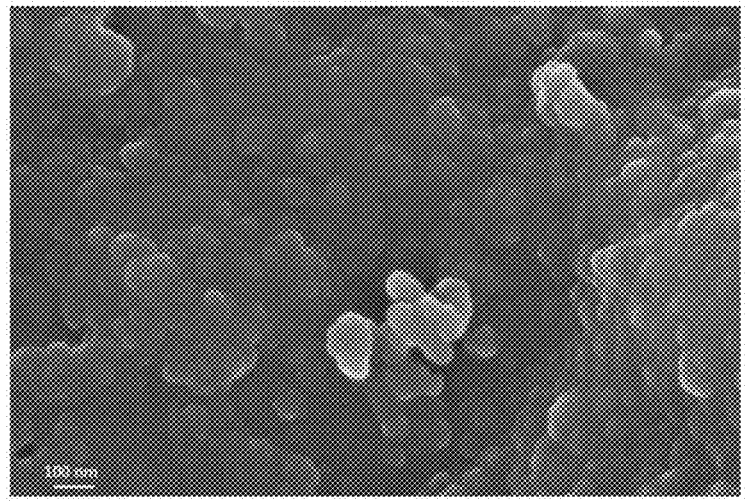
FIG. 1A depicts a Scanning Electron Microscope image of an activated carbon coated electrode surface according to some embodiments of the present disclosure.

A hybrid pseudocapacitor generally comprises two or more active materials that can store energy electrostatically, electrochemically or by a combination of electrostatically and electrochemically. In some embodiments the hybrid pseudocapacitor can comprise first electrode that stores energy electrostatically, electrochemically, or by a combination of electrostatically and electrochemically and a second electrode that stores energy electrostatically, electrochemically or combination of electrostatically and electrochemically. The first electrode can be, in some configurations, a cathode. The second electrode can be, in some embodiments, an anode.

The hybrid pseudocapacitor can further comprise a separator that is positioned between the first and second electrodes. The separator is an electronic insulator and allows for ionic conducting between the electrodes.

The hybrid pseudocapacitor can further include an ionic electrolyte. The ionic electrolyte is typically in ionic contact with the first and second electrodes. In some embodiments, the ionic electrolyte is in ionic contact with the first and second electrodes and separator.

The hybrid pseudocapacitor can further comprise an enclosure. The first and second electrodes are contained within the enclosure. For hybrid pseudocapacitors having a separator, the separator is also contained within the enclosure. It can be appreciated that the ionic electrolyte can also be contained within the enclosure.

The hybrid pseudocapacitor can also include first and second leads. The first lead is electrically interconnected to the first electrode and second lead is electrically interconnected to the second electrode. Electrical interconnects can be made external to the enclosure to first and second leads.

Cathode Active Materials

Generally, the cathode active material can comprise one or more active materials that can store energy electrostatically at the Helmholtz double layer between the cathode and the electrolyte. The one or more active materials can store energy electrochemically by Faradic redox reactions. Moreover, the one or more cathode active materials can store energy electrostatically at the Helmholtz double layer between electrode and electrolyte. In some embodiments, the one or more active materials can be a carbonaceous material. The carbonaceous material can be a high surface area, activated carbon.

Generally, one or more cathode active material that can store energy electrochemically by Faradic redox reactions can be selected from, but not limited to, metal oxides, metal nitrides, metal sulfides, metal phosphates, polymers, and ion conducting or solid electrolytes, or a mixture thereof.

The cathode active material can comprise a transition metal oxide, a post-transition metal oxide, or a mixture thereof. Generally, the cathode active material can comprise an alkali metal oxide, an alkaline earth metal oxide, or a mixture thereof. In some embodiments, the cathode active material can be selected from the group consisting of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, or a mixture thereof. More specifically, the metal oxide can be a post-transition metal oxide, or a mixture thereof. Commonly, the metal oxide can be an alkali metal oxide, an alkaline earth metal oxide, or a mixture thereof. In some embodiments, the metal oxide is selected from the group consisting of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, or a mixture thereof.

The cathode active material can comprise a transition metal fluoride, a post-transition metal fluoride, or a mixture thereof. Generally, the cathode active material can be an alkali metal fluoride, an alkaline earth metal fluoride, or a mixture thereof. In some embodiments, the cathode active material can be selected from the group consisting essentially of $MnF_2$, $FeF_3$, $CoF_2$, $NiF_2$, $CuF_2$, $CsF$, $LiF$, $KF$, $RbF$, $NaF$, $CaF_2$, $SrF_2$, $BaF_2$, or a mixture thereof. Typically, metal fluoride can be a transition metal fluoride, a post-transition metal fluoride, or a mixture thereof. More typically, the metal fluoride can be an alkali metal fluoride, an alkaline earth metal fluoride, or a mixture thereof. In some embodiments, the metal fluoride is selected from the group consisting essentially of $MnF_2$, $FeF_3$, $CoF_2$, $NiF_2$, $CuF_2$, CsF, LiF, KF, RbF, NaF, $CaF_2$, $SrF_2$, $BaF_2$, or a mixture thereof.

The cathode active material can comprise a transition metal phosphate, a post-transition metal phosphate, or a mixture thereof. Generally, the cathode active material can be an alkali metal phosphate, an alkaline earth metal phosphate, or a mixture thereof. In some embodiments, the cathode active material can be selected from the group consisting essentially of $AlPO_4$, $TiPO_4$, $FeAlPO_4$, $SAlPO_4$, $CoAlPO_4MnAlPO_4$, $Li_3PO_4$, $NaH_2PO_4$, or a mixture thereof. Usually, the metal phosphate is a transition metal phosphate, a post-transition metal phosphate, or a mixture thereof. In some embodiments, the metal phosphate can be an alkali metal phosphate, an alkaline earth metal phosphate, or a mixture thereof. Commonly, the metal phosphate is selected from the group consisting essentially of $AlPO_4$, $TiPO_4$, $FeAlPO_4$, $SAlPO_4$, $CoAlPO_4MnAlPO_4$, $Li_3PO_4$, $NaH_2PO_4$, or a mixture thereof.

The active material can be selected from the group consisting of TiN, TaN, HfN, $Hf_3N_4$, $Zr_3N_4$, $ZrN_x$, and NbN, and a mixture thereof. Commonly, the metal nitride can be selected from the group consisting essentially of the group consisting of TiN, TaN, HfN, $Hf_3N_4$, $Zr_3N_4$, $ZrN_x$, and NbN, and a mixture thereof.

The cathode active material from the group consisting essentially of PbS, ZnS, CaS, BaS, SrS, $Cu_xS$, CdS, $In_2S_3$, $WS_2$, $TiS_2$, $Sb_2S_3$, SnS, $GaS_x$, GeS, $MoS_2$, and $Li_2S$, and a mixture thereof. Usually, the metal sulfide can be selected from the group consisting essentially of the group consisting of PbS, ZnS, CaS, BaS, SrS, $Cu_xS$, CdS, $In_2S_3$, $WS_2$, $TiS_2$, $Sb_2S_3$, SnS, $GaS_x$, GeS, $MoS_2$, and $Li_2S$, and a mixture thereof.

In some embodiments, the ion conducting and/or electric conducting polymer as the cathode active material can be selected from polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PANI), poly(thiophene) (PT), poly(3,4-ethylenedioxythiophene) (PEDOT), poly(p-phenylene sulfide) (PPS), or a mixture thereof. Commonly, the ion conducting and/or electric conducting polymer is one of a polyimide, poly(fluorene), polyphenylenes, polypyrenes, polyazulene, polynaphthalenes, poly(acetylene) (PAC), poly (p-phenylene vinylene) (PPV), poly(pyrrole) (PPY), polycarbazole, polyindole, polyazepine, polyaniline (PAM), poly (thiophene) (PT), poly(3,4-ethylenedioxythiophene) (PEDOT), poly(p-phenylene sulfide) (PPS), or a mixture thereof.

The cathode active material can be an ion conducting or solid electrolyte. Typically, the cathode active can be selected from a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor, and a mixture thereof. Commonly, the ion conducting electrolyte can be selected from the group consisting essentially of a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor, and a mixture thereof. In some embodiments, the solid electrolyte can be selected from the group consisting essentially of a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor, and a mixture thereof. Some embodiments can include an ion conducting electrolyte selected from the group consisting essentially of an alkali metal aluminum oxide, an alkali metal fluoride, an alkali metal sulfide, an alkaline earth metal oxide, an alkaline earth fluoride, and a mixture thereof. Some embodiments can include a solid electrolyte selected from the group consisting essentially of an alkali metal aluminum oxide, an alkali metal fluoride, an alkali metal sulfide, an alkaline earth metal oxide, an alkaline earth fluoride, and a mixture thereof.

The cathode active material can comprise a material generally represented by the following chemical formula: $M_zAlX_y$, where M is one of alkali metal, X is one of oxygen or fluorine and z has a value from about 0.5 to about 10 and y has a value from about 1.75 to about 6.5. More specifically, z has a value from about 1 to about 5 and y has a value from about 2 to about 4. In some embodiments, the ion conducting electrolyte can be a material generally represented by the following chemical formula: $M_zAlX_y$, where M is one of alkali metal, X is one of oxygen or fluorine and z has a value from about 0.5 to about 10 and y has a value from about 1.75 to about 6.5. More specifically, z has a value from about 1 to about 5 and y has a value from about 2 to about 4. In some embodiments, the solid electrolyte can be a material generally represented by the following chemical formula: $M_zAlX_y$, where M is one of alkali metal, X is one of oxygen or fluorine and z has a value from about 0.5 to about 10 and y has a value from about 1.75 to about 6.5. More specifically, z has a value from about 1 to about 5 and y has a value from about 2 to about 4.

In some embodiments, the cathode active material can comprise an alkali metal aluminum oxide. Moreover, the ion conducting electrolyte can be, in some embodiments, an alkali metal aluminum oxide. The solid electrolyte can be, in some embodiments, an alkali metal aluminum oxide. Generally, the alkali metal aluminum oxide comprises lithium aluminum oxide, $LiAlO_x$.

In some embodiments, the cathode active material can comprise an alkali metal aluminum fluoride. Moreover, the ion conducting electrolyte can be, in some embodiments, an alkali metal aluminum fluoride. The solid electrolyte can be, in some embodiments, an alkali metal aluminum fluoride. Generally, the alkali metal aluminum oxide comprises lithium aluminum oxide, $LiAlF_x$.

In some embodiments, the cathode active material can be a mixture of $LiAlO_x$ and $LiAlF_x$. Moreover, the ion conducting electrolyte can be, in some embodiments, be a mixture of $LiAlO_x$ and $LiAlF_x$. The solid electrolyte can be, in some embodiments, be a mixture of $LiAlO_x$ and $LiAlF_x$. The mixture of $LiAlO_x$ and $LiAlF_x$ can have a Li:Al molar ratio and wherein the Li:Al molar ratio is selected from the group consisting of: 1:1, 1.5:1, 2:1, 2.5:1, 3:1, 3.5:1, 4:1, 4.5:1 and 5:1.

The cathode active material can comprise lithium niobium oxide. Moreover, the alkali metal oxide can comprise lithium niobium oxide. It can be appreciated that lithium niobium oxide can be generally represented by the following chemical formula: $Li_xNO_y$, where x can have a value from about 1 to about 5 and y can have a value from about 3 to 5.

The cathode active material can comprise a Garnet solid electrolyte. The Garnet solid electrolyte can be selected from the group consisting essentially of $Li_5La_3Ta_2O_{12}$, $Li_7La_3Zr_2O_{12}$, $Li_3Ln_3Te_2O_{12}$ where Ln comprises a lanthanide, or a mixture thereof.

The cathode active material can comprise a lithium super ionic conductor. The lithium super ionic conductor can be selected from the group consisting of $Li_{3.5}Zn_{0.25}GeO_4$, $Li_{3.4}Si_{0.4}V_{0.6}O_4$, $Li_2ZnGeO_4$, $Li_{2+2x}Zn_{1-x}GeO_4$ where x has a value from about −0.36 to about 0.87, and a mixture thereof.

The cathode active material can comprise a material having a lithium super ionic conductor structure. In some embodiments, the material having the lithium super ionic conductor structure can be selected from the group consisting of essentially of $Li_{3.25}Ge_{0.25}P_{0.75}S_4$, $Li_{4-x}M_{1-y}M'_yS_4$ (where M is one of Si, Ge, or a mixture thereof and where M' is selected from the group consisting of P, Al, Zn, Ga), and a mixture thereof.

Generally, one or more cathode active materials can be mixed or prepared mechanically, chemically, electrochemically, or combination thereof. More generally one or more cathode active materials can be mixed or prepared at a molecular level, an atomic level, or a combination thereof. Moreover, the one or more cathode active materials can be mixed or prepared and chemically bonded to each other. Typically, the one or more cathode active materials can be mixed or prepared conformally by chemical vapor deposition, physical vapor deposition, chemical deposition, electrochemical deposition, spraying deposition, spin coating deposition, and atomic layer deposition, or a combination thereof. More typically, the one or more cathode active materials are mixed or prepared at atomic level by atomic layer deposition.

Generally, the one or more cathode active materials can cover the Helmholtz double layer active materials at a molecular level or at atomic level, or a combination thereof. More generally, the one or more cathode active materials and the Helmholtz double layer active materials can be chemically bonded to each other. In some embodiments, the one or more cathode active materials can be coated conformally onto the Helmholtz double layer active materials by chemical vapor deposition, physical vapor deposition, chemical deposition, electrochemical deposition, spraying deposition, spin coating deposition, and atomic layer deposition, or a combination thereof. Typically, the one or more cathode active materials can be coated conformally onto the Helmholtz double layer active materials at an atomic level by atomic layer deposition.

Functional Coatings

The cathode active material and/or the cathode electrode of the hybrid pseudocapacitor can be coated with one or more functional layers. The one of more functional layers can provide or enhance a specific function, and/or enhance and provide one or more functions. In this manner, the addition of one of more layers can provide and/or enhance functionality. Generally, the one or more functional layers can be selected from the group consisting essentially of metal oxides, metal nitrides, metal sulfides, metal phosphates, polymers, an ion conducting, a solid electrolyte, and a mixture thereof. Without wanting to be bound by any theory, it is believed that the one or more functional layers enhance electrochemical performance, provide protection, and strengthen stabilities for long-term cycle life and storage life.

In some embodiments, the one or more functional layers can comprise a metal oxide. The metal oxide can be selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, and a mixture thereof.

In some embodiments, the one or more functional layers can comprise a metal nitride. The metal nitride can be selected from the group consisting essentially of TiN, TaN, HfN, $Hf_3N_4$, $Zr_3N_4$, $ZrN_x$, and NbN, and a mixture thereof.

In some embodiments, the one or more functional layers can comprise a metal sulfide. The metal sulfide can be selected from the group consisting essentially of PbS, ZnS, CaS, BaS, SrS, $Cu_xS$, CdS, $In_2S_3$, $WS_2$, $TiS_2$, $Sb_2S_3$, SnS, $GaS_x$, GeS, $MoS_2$, and $Li_2S$, and a mixture thereof.

In some embodiments, the one or more functional layers can comprise a metal phosphate. The metal phosphate can be selected from the group selected from the group consisting essentially of $AlPO_4$, $TiPO_4$, $FeAlPO_4$, $SiAlPO_4$, $CoAlPO_4$ $MnAlPO_4$, $Li_3PO_4$, $NaH_2PO_4$, and a mixture thereof.

The one or more functional layers can be selected from the group consisting essentially of a polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof. In some embodiments, the ion conducting and/or electric conducting polymer can be selected from the group consisting essentially of a polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PANT), poly(thiophene) (PT), poly(3,4-ethylenedioxythiophene) (PEDOT), poly(p-phenylene sulfide) (PPS), and a mixture thereof. In some embodiments, the cathode ion conducting and/or electric conducting polymer can be selected from the group consisting essentially of a polyimide, poly(fluorene), polyphenylenes, polypyrenes, polyazulene, polynaphthalenes, poly(acetylene) (PAC), poly(p-phenylene vinylene) (PPV), poly(pyrrole) (PPY), polycarbazole, polyindole, polyazepine, polyaniline (PAM), poly(thiophene) (PT), poly(3,4-ethylenedioxythiophene) (PEDOT), poly(p-phenylene sulfide) (PPS), and a mixture thereof.

The one or more functional layers can be selected from the group consisting essentially of a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor, and a mixture thereof. In some embodiments, the ion conducting layer can be selected from the group consisting essentially of a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor, and a mixture thereof. In some embodiments, the solid electrolyte functional layer can be selected from the group consisting essentially of a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor, and a mixture thereof.

The one or more cathode ion conducting or solid electrolyte functional layers can comprise a metal oxide, a metal fluoride, or mixture thereof. The one or more cathode ion conducting or solid electrolyte functional layers can be selected from the group consisting essentially of an alkali metal aluminum oxide, an alkali metal fluoride, an alkali metal sulfide, an alkaline earth metal oxide, an alkaline earth fluoride, or a mixture thereof. The ion conducting electrolyte can comprise a metal oxide, a metal fluoride, or mixture thereof. The ion conducting electrolyte can be selected from the group consisting essentially of an alkali metal aluminum oxide, an alkali metal fluoride, an alkali metal sulfide, an alkaline earth metal oxide, an alkaline earth fluoride, or a mixture thereof. The solid electrolyte can comprise a metal oxide, a metal fluoride, or mixture thereof. The solid electrolyte can be selected from the group consisting essentially of an alkali metal aluminum oxide, an alkali metal fluoride, an alkali metal sulfide, an alkaline earth metal oxide, an alkaline earth fluoride, or a mixture thereof.

The functional layer can have the following chemical composition: $M_zAlX_y$, where M can be an alkali metal, X can be oxygen or fluorine and z can have a value from about 0.5 to about 10 and y can have a value from about 1.75 to about 6.5. In some embodiments, z can have a value from about 1 to about 5. In some embodiments, y can have a value from about 2 to about 4. The ion conducting electrolyte can have the following chemical composition: $M_zAlX_y$, where M can be an alkali metal, X can be oxygen or fluorine and z can have a value from about 0.5 to about 10 and y can have a value from about 1.75 to about 6.5. In some embodiments, z can have a value from about 1 to about 5. In some embodiments, y can have a value from about 2 to about 4. The solid electrolyte can have the following chemical composition: $M_zAlX_y$, where M can be an alkali metal, X can be oxygen or fluorine and z can have a value from about 0.5 to about 10 and y can have a value from about 1.75 to about 6.5. In some embodiments, z can have a value from about 1 to about 5. In some embodiments, y can have a value from about 2 to about 4.

Some embodiments can include an alkali metal aluminum oxide functional layer. The alkali metal aluminum oxide functional layer can be a lithium aluminum oxide, $LiAlO_x$. Some embodiments include an alkali metal aluminum fluoride. The alkali metal aluminum fluoride can comprises lithium aluminum fluoride, $LiAlF_x$. Some embodiments include a mixture of $LiAlO_x$ and $LiAlF_x$ having a Li:Al molar ratio and wherein the Li:Al molar ratio can be selected from the group consisting essentially of 1:1, 1.5:1, 2:1, 2.5:1, 3:1, 3.5:1, 4:1, 4.5:1 and 5:1.

In some embodiments, the alkali metal oxide functional layer comprises lithium niobium oxide, $Li_xNO_y$, where x can have a value from about 1 to about 5 and y can have a value from about 3 to about 5.

Some embodiments can include a Garnet solid electrolyte functional layer. The Garnet solid electrolyte functional layer can be selected from the group consisting essentially of $Li_5La_3Ta_2O_{12}$, $Li_7La_3Zr_2O_{12}$, and $Li_3Ln_3Te_2O_{12}$ where Ln comprises a lanthanide, or a mixture thereof.

Some embodiments can include a lithium super ionic conductor functional layer. The lithium super ionic conductor functional layer can be selected from the group consisting essentially of $Li_{3.5}Zn_{0.25}GeO_4$, $Li_{3.4}Si_{0.4}V_{0.6}O_4$, $Li_2ZnGeO_4$, $Li_{2+2x}Zn_{1-x}GeO_4$ where x can have a value from about −0.36 to about 0.87, and a mixture thereof.

Some embodiments can include a sulfide functional layer. The sulfide functional layer can have a lithium super ionic conductor structure. The sulfide functional layer can be selected from the group consisting essentially of $Li_{3.25}Ge_{0.25}P_{0.75}S_4$, $Li_{4-x}M_{1-y}M'_yS_4$ where M can be one of Si, Ge, or a mixture thereof and where M' can be selected from the group consisting essentially of P, Al, Zn, Ga, and a mixture thereof.

Anode Active Materials

Generally, the anode active material consists of one or more active materials that can store energy electrostatically, electrochemically, or a mixture thereof. More generally one or more anode active materials can be a carbonaceous material. The carbonaceous material can be a high surface area, activated carbon.

In some embodiments, the carbonaceous material can be selected from the group consisting essentially of graphite, soft carbon, hard carbon, graphene, graphene oxide, carbon nanotube, or a mixture thereof. Moreover, the graphite can be selected from the group consisting essentially of natural graphite, crystalline flack graphite, amorphous graphite, pyrolytic graphite, graphene, lump graphite, and graphite fiber, and a mixture thereof. The soft carbon can be from organic precursors that melt before they pyrolyze (graphitizable). Generally, the soft carbon can comprise neatly stacked graphene layers that have less long range order. In some embodiments, the soft carbon can be a petroleum coke. The hard carbon can be made from organic precursors that char as they pyrolyze (non-graphitizable). Typically, the hard carbon can comprise graphene layers that are not neatly stacked, that is non-crystalline and macroscopically isotropic.

Generally, the one or more anode active materials that can store energy electrochemically can be ionically pre-doped. More generally, the one or more anode active materials that can store energy electrochemically can be pre-doped with lithium or pre-lithiated. Typically, the one or more anode active materials can pre-lithiated chemically or electrochemically. Moreover, the one or more anode active materials can be pre-lithiated chemically or electrochemically by an in-situ or an ex-situ method. The one or more anode active materials can be pre-lithiated chemically or electrochemically by an in-situ or an ex-situ method using lithium metal or stabilized lithium metal powder.

Activated Carbon

In some embodiments, the high surface area, activated carbon is selected from the group consisting of a surface area of equal to or more than about 50 m$^2$/g, equal to or more than about 100 m$^2$/g, equal to or more than about 500 m$^2$/g, equal to or more than about 1000 m$^2$/g, equal to or more than about 2000 m$^2$/g, or equal to or more than about 3000 m$^2$/g.

Separator

In some embodiments, the separator can be selected from the group consisting essentially of polymer films including polyolefin such as polyethylene, polypropylene, poly(tetrafluoroethylene), polyvinyl chloride, nonwoven fibers including cotton, nylon, polyesters, glass, and naturally occurring substances including rubber, asbestos, and wood, or a mixture thereof. In some embodiments, the separator can have a coating layer. In some embodiments, the coating layer and the one or more of the ion conducting layer and the solid electrolyte layers can have substantially the same chemical composition.

Electrolyte

The ionic conducting electrolyte can be selected the group consisting essentially of an aqueous electrolyte, a non-aqueous electrolyte, an aprotic liquid electrolyte, a room temperature ionic liquid electrolyte, a polymeric electrolyte, a polymeric gel electrolyte, a solid state electrolyte, and a mixture thereof. The aqueous electrolyte can comprise an aqueous ionic conducting salt dissolved in an aqueous solvent. In some embodiments, the aqueous ionic conducting salt can be selected from the group consisting essentially of potassium chloride, lithium chloride, and a mixture thereof. The ionic conducting electrolyte can be a lithium ion conducting electrolyte. In some embodiments, the lithium ion electrolyte can be selected from the group consisting essentially of a non-aqueous electrolyte, an aprotic liquid electrolyte, a room temperature ionic liquid electrolyte, a polymeric electrolyte, a polymeric gel electrolyte, a solid state electrolyte, and a mixture thereof.

The non-aqueous electrolyte or an aprotic liquid electrolyte comprises an electrolyte salt dissolved in organic solvents. In some embodiments, the electrolyte salt can be selected from the group consisting essentially of tetraethylammonium tetrafluoroborate (TEABF$_4$), triethylmethylammonium tetrafluoroborate (TEMABF$_4$), spirobipyrrolidinium tetrafluoroborate (SBPBF$_4$), and a mixture thereof. The non-aqueous electrolyte or an aprotic liquid electrolyte can comprise a lithium ion electrolyte salt dissolved in organic solvents. The lithium ion electrolyte salt can be selected from the group consisting essentially of lithium hexafluorophosphate, lithium hexafluoroarsenate (LiPF$_6$), lithium perchlorate, lithium tetrafluoroborate (LiBF$_4$), lithium trifluoromethane sulfonate, lithium bis(fluorosulfonyl)imide, lithium bis(trifluoromethanesulfonyl)imide, lithium bis(pentafluoroethylsulfonyl)imide, lithium tris(trifluoromethylsulfonyl)methide, lithium trifluoro tris(pentafluoroethyl)phosphate, lithium bis(oxalato)borate (LiBOB), lithium hexafluoroisopropoxide, lithium malonate borate, lithium difluoro(oxalato) borate, lithium hexafluoroantimonate (LiSbF$_6$), and a mixture thereof. The organic solvent can be selected from the group consisting essentially of nitrile, carbonate, ester, ether, sulfone, acetal, and a mixture thereof. The organic nitrile solvent can be selected from the group consisting essentially of acetonitrile, butyronitrile, valeronitrile, hexanenitrile, 3-methoxypropionitrile, and a mixture thereof. The organic carbonate solvent can be selected from the group consisting of essentially of ethylene carbonate, propylene carbonate, dimethyl carbonate, diethyl carbonate, ethyl methyl carbonate, fluorinated carbonates, e.g. methyl trifluoroethyl carbonate, and a mixture thereof. In some embodiments, the organic carbonate solvent used as an additive can be selected from the group consisting essentially of vinylene carbonate, fluoroethylene carbonate, and a mixture thereof. The organic ester solvent is selected from the group consisting of γ-butyrolactone, ethyl acetate, ethyl propionate, methyl propionate, methyl butyrate, ethyl butyrate, propyl butyrate, butyl butyrate, and a mixture thereof. The organic ether and acetal solvents can be selected from the group consisting of 1,3-dioxolane, diglyme, and a mixture thereof. The organic sulfone solvent can be selected from the group consisting essentially of ethylmethyl sulfone, 2,2,2-trifluoroethylmethyl sulfone, ethyl-sec-butyl sulfone, and a mixture thereof. Generally, a room temperature ionic liquid electrolyte comprises an electrolyte salt dissolved in room temperature ionic liquids.

Some embodiments include a room temperature ionic liquid. The room temperature ionic liquids can comprise a cation selected from the group consisting of imidazolium, pyridinium, pyrrolidinium, phosphonium, ammonium, and anions including BF$_4^-$, PF$_6^-$, CF$_3$SO$_3^-$, N(CF$_3$SO$_2$)$_2^-$, (C$_4$F$_9$)$_3$PF$_3^-$, and a mixture thereof. The cation of room temperature ionic liquid can be selected from the group consisting essentially of N-Ethyl-N,N-dimethyl-2-methoxyethyl ammonium, 1-butyl-1methyl-pyrrolidinium, 1-Ethyl-3-methylimidazolium, 1-methyl-3-propylpyrrolidinium or a mixture thereof. In some embodiments, the room temperature ionic liquid can comprise an anion. The anion can be selected from the group consisting essentially of tris(pentafluoroethyl)trifluorophosphate), bis(trifluoro methyl sulfonyl) imide), bis(fluorosulfonyl)imide or a mixture thereof.

Generally, a polymeric electrolyte can comprise an electrolyte salt incorporated in polymeric backbones.

Some embodiments include a polymeric electrolyte. The polymeric electrolyte can be selected from the group consisting essentially of polyethylene oxide, polyacrylonitrile, polymethyl methacrylate, polyvinylidene fluoride, polyvinylidene fluoride, hexafluoropropylene, and a mixture thereof. The polymeric gel electrolyte can comprise one or more electrolyte salts, one or more polymers, and one or more solvents. Generally, the ion conducting or solid electrolyte can be selected from the group consisting essentially of a metal oxide, a metal fluoride, a Garnet ion conductor, a sodium super ionic conductor, a lithium super ionic conductor, a sulfide having a lithium super ionic conductor structure, a lithium phosphorous nitrogen ion conductor, and a mixture thereof.

Generally, the ion conducting or solid electrolyte comprise a metal oxide or a metal fluoride selected from the group consisting of an alkali metal aluminum oxide, an alkali metal fluoride, an alkali metal sulfide, an alkaline earth metal oxide, an alkaline earth fluoride, or a mixture thereof.

In some embodiments, an ion conducting or a solid electrolyte has the following chemical composition: M$_z$AlX$_y$, where M is one of alkali metal, X is one of oxygen or fluorine and z has a value from about 0.5 to about 10 and y has a value from about 1.75 to about 6.5. More specifically, z has a value from about 1 to about 5 and y has a value from about 2 to about 4.

More specifically, an alkali metal aluminum oxide solid electrolyte comprises lithium aluminum oxide, LiAlO$_x$. More specifically, LiAlO$_x$ has a Li:Al molar ratio and wherein the Li:Al molar ratio is selected from the group consisting of: 1:1, 1.5:1, 2:1, 2.5:1, 3:1, 3.5:1, 4:1, 4.5:1 and 5:1.

In some embodiments, the alkali metal oxide solid electrolyte can comprise lithium niobium oxide, Li$_x$NbO$_y$, where x has a value from about 1 to about 5 and y has a value from about 3 to 5.

In some embodiments, the Garnet solid electrolyte is selected from the group consisting of Li$_5$La$_3$Ta$_2$O$_{12}$, Li$_7$La$_3$Zr$_2$O$_{12}$, Li$_3$Ln$_3$Te$_2$O$_{12}$ where Ln comprises a lanthanide, or a mixture thereof.

In some embodiments, the lithium super ionic conductor solid electrolyte is selected from the group consisting of Li$_{3.5}$Zn$_{0.25}$GeO$_4$, Li$_{3.4}$Si$_{0.4}$V$_{0.6}$O$_4$, Li$_2$ZnGeO$_4$, Li$_{2+2x}$Zn$_{1-x}$GeO$_4$ where x has a value from about −0.36 to about 0.87, or a mixture thereof.

In some embodiments, the sulfide having a lithium super ionic conductor structure solid electrolyte is selected from the group consisting of comprises Li$_{3.25}$Ge$_{0.25}$P$_{0.75}$S$_4$, Li$_{4-x}$M$_{1-y}$M'$_y$S$_4$, where M is one of Si, Ge, or a mixture thereof and where M' is selected from the group consisting of P, Al, Zn, Ga, or a mixture thereof.

Anode Electrode

The anode electrode can comprise one or more anode active materials, a polymeric binder, a conductive carbon, and an anode current collector. The anode active materials can store energy electrostatically or electrochemically or both. Typically, the conductive carbon can be selected from the group consisting of carbon black, conductive graphite, carbon nanotube, graphene, or a mixture thereof. In accordance with some embodiments, the anode electrode can have from about 80% to about 98 wt % of the one or more anode active materials, from about 1% to about 10 wt % of the conductive carbon, and from about 1% to about 10 wt % of the polymeric binder (excluding the weight of the anode current collector). Generally, the anode current collect generally is selected from the group consisting essentially of copper, nickel, titanium, stainless steel, carbon coated copper, carbon coated nickel, carbon coated titanium, or carbon coated stainless steel.

Cathode Electrode

The cathode electrode can comprise one or more cathode active materials, a polymeric binder, a conductive carbon, and a cathode current collector. The conductive carbon is generally in the form of particles. The conductive carbon can be selected from the group consisting essentially of carbon black, conductive graphite, carbon nanotube, graphene, or a mixture thereof, and a current collector. The cathode active materials can store energy electrostatically or electrochemically or both. In accordance with some embodiments, the cathode can have from about 80% to about 98 wt % of the one or more cathode active materials, from about 1% to about 10 wt % of the conductive carbon particles, and from about 1% to about 10 wt % of the polymeric binder (excluding the weight of the current collector). In some embodiments, the carbon black can be selected from the group consisting essentially of carcass grade carbon black, furnace grade carbon black, hard carbon black, soft carbon black, thermal carbon black, acetylenic thermal carbon black, channel black, lamp black, carbon nanotube, graphene, or a mixture thereof. Generally, the conductive graphite can be selected from the group consisting essentially of natural graphite, crystalline flack graphite, amorphous graphite, pyrolytic graphite, graphene, lump graphite, and graphite fiber, or a mixture thereof. Typically, the cathode current collector can be selected from the group consisting essentially of aluminum, nickel, titanium, stainless steel, carbon coated aluminum, carbon coated nickel, carbon coated titanium, or carbon coated stainless steel.

Polymeric Binder

The polymeric binder can be selected from the group consisting essentially of poly(tetrafluoroethylene), poly(vinylidenefluoride) homopolymer, poly(vinylidenefluoride) co-polymer, styrene-butadiene rubber/carboxymethylcellulose aqueous copolymers, lithium poly(acrylic acid) aqueous polymer, or a mixture thereof.

Enclosure or Case

The enclosure or case for hybrid pseudocapacitor can comprise one of aluminum laminated film pouch or a metal case. In some embodiments, the metal case for the hybrid pseudocapacitor can comprise a metal. Commonly, the metal can be selected from the group consisting essentially of aluminum, nickel, titanium, and stainless steel.

EXAMPLES

The electrodes and devices in the following examples were prepared by one or more of the following methods. In some of the examples, the atomic deposited layers were applied to carbonaceous and/or activated carbon materials. In some of the examples, the atomic deposited layer were applied to conductive carbon materials. In some of the examples, the atomic deposited layers were applied to mixture comprising carbonaceous and/or activated carbon materials.

Activated Carbon Materials

Table 1 shows the three different types of activated carbon materials evaluated. The activated carbon materials and electrode compositions were chosen for maintaining high accessible surface area throughout the electrode casting and drying processes. The selection of these specific active materials was primarily based on the ability to understand atomic layer deposited coatings on the activated carbon material's specific surface area ($m^2/g$) and pore size

TABLE 1

| Activated carbon (AC) | Material surface area ($m^2/g$) | Pore size (nm) |
|---|---|---|
| AC1 | 2000 | 1.2 |
| AC2 | 250 | 10 |
| Graphene | 400 | N/A * |

* Displays a percentage and range of effective pore sizes

Electrolytes for Symmetric and Asymmetric Supercapacitors

A total of 28 supercapacitor electrolyte formulations, were studied (Table 2).

TABLE 2

| Electrolyte | Salt | Solvent | Additive | Solubility | Note |
|---|---|---|---|---|---|
| CE1 | $TEABF_4$ | PC | — | Complete | — |
| CE2 | $TEABF_4$ | AN | — | Complete | — |
| CE3 | KCl | DI Water | — | Complete | — |
| CE4 | $TEABF_4$ | EMC | — | Partial | — |
| CE5 | $TEABF_4$ | DEC | — | Partial | — |
| CE6 | $TEABF_4$ | GBL | — | Complete | — |
| CE7 | $TEABF_4$ | DMC | — | Partial | — |
| CE8 | $TEABF_4$ | EC DMC | — | Complete | — |
| CE9 | $TEABF_4$ | DMC EMS | — | Partial | — |
| CE10 | $TEABF_4$ | EC EMC | — | Complete | — |
| CE11 | $TEABF_4$ | EC DEC | — | Complete | — |
| CE12 | $TEABF_4$ | PC EMS | — | Complete | — |
| CE13 | $TEABF_4$ | EC DMC EMS | — | Complete | — |
| CE14 | $LiPF_6$ | EC DMC | — | Complete | Baseline |
| CE15 | $TEABF_4$ | EC DEC EMS | — | Complete | — |
| CE16 | $LiPF_4$ | EC DMC EMS | — | Nearly Complete | — |
| CE17 | LiBOB | EC DMC EMS | — | Nearly Complete | — |
| CE18 | $TEABF_4$ | PC | 1.5% VC | Complete | CE1 + Additive |
| CE19 | $TEABF_4$ | PC | 1.5% FEC | Complete | CE1 + Additive |
| CE20 | $TEABF_4$ | EC DEC EMS | 1.5% VC | Complete | CE15 + Additive |
| CE21 | $TEABF_4$ | EC DEC EMS | 1.5% FEC | Complete | CE15 + Additive |
| CE22 | $LiSbF_6$ | EC DMC EMS | — | Complete | — |
| CE23 | $TEABF_4$ | PC EMS 2:1 | — | Complete | — |
| CE24 | $TEABF_4$ | PC EMS 5:1 | — | Complete | — |
| CE25 | $TEABF_4$ | PC | 1% FEC | Complete | CE1 + Additive |
| CE26 | $TEABF_4$ | PC | 0.5% FEC | Complete | CE1 + Additive |
| CE27 | 1.5M $TEABF_4$ | PC | — | Nearly Complete | — |
| CE28 | 2.0M $TEABF_4$ | PC | — | Complete | — | distribution (nm). Activated carbon #1 (AC1) offers a combination of extremely high surface area and small pore size, while activated carbon #2 (or AC2) and graphene are characterized by an approximate order of magnitude less surface area. In the case of AC2, the lower surface area is primarily the result of pores that are approximately an order of magnitude greater than AC1. Graphene differs from AC2 in its larger effective pore size that is displayed as a percentage and range of effective pore size.

Scanning Electron Microscopy Images of Coated Samples

Figure 1B:
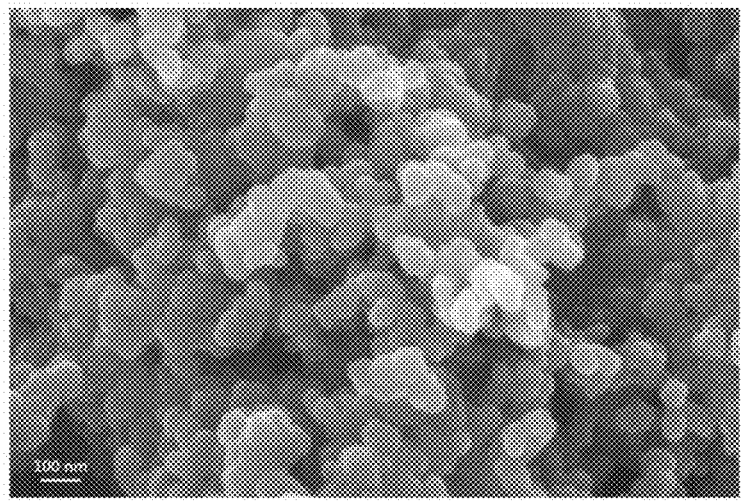
FIG. 1B depicts a Scanning Electron Microscope image of an activated carbon and atomically deposited vanadium oxide ($V_2O_5$) coated electrode surface according to some embodiments of the present disclosure.
Figure 1C:
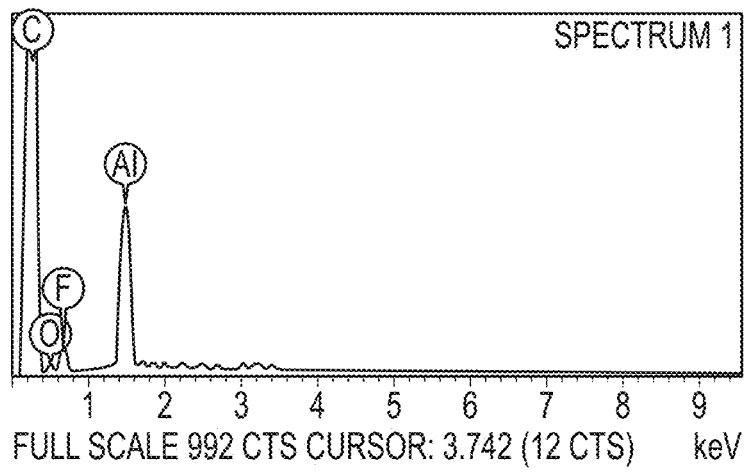
FIG. 1C depicts an X-Ray Dispersive Analysis of the electrode surface of FIG. 1A.
Figure 1D:
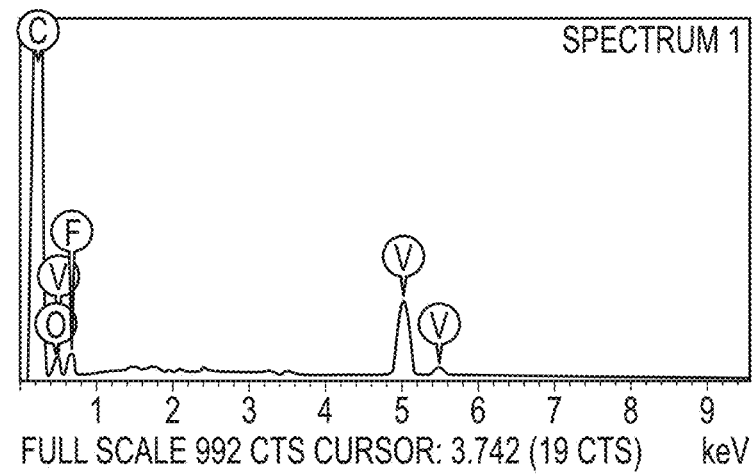
FIG. 1D depicts an X-Ray Dispersive Analysis of the electrode surface of FIG. 1B.

In this example, $V_2O_5$ was on activated carbon (AC2) for its moderate surface area and large pore size to ensure good atomic deposited layers of the oxide infiltration. FIG. 1A shows a scanning electron microscopy image of the uncoated activated carbon. FIG. 1B shows a scanning electron microscopy image of the $V_2O_5$ on the activated carbon. FIG. 1B, metal coated activated carbon, has a brighter contrast for the particles due to electron charge difference of the coated oxide, compared with the more uniform brightness of the non-metal coated activated carbon, FIG. 1A. The electron dispersive x-ray spectrum of the coated activated carbon, FIG. 1D, shows the presence of vanadium which is totally absent in the uncoated activated carbon, FIG. 1C. The scanning electron microscopy and electron dispersive x-ray studies show the intended oxide coating on the activated carbon (AC2). It is interesting to note that the atomic layer deposited $V_2O_5$ is in the nano-size range.

Symmetric Supercapacitor Cells

Figure 2:
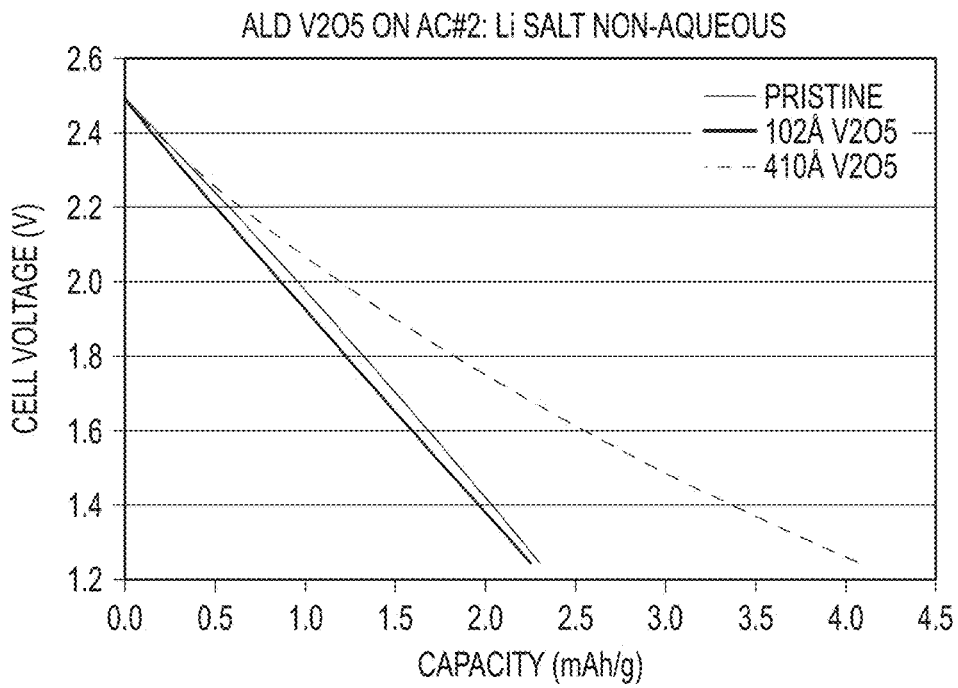
FIG. 2 depicts discharge voltage profiles of electrodes according to some embodiments of the present disclosure.

Atomic layer deposited $V_2O_5$ coated activated carbon (AC2) was fabricated into electrode discs. The electrode discs were used in symmetric supercapacitor coin cells. FIG. 2 shows discharge voltage profiles of some of the coated electrodes versus the uncoated activated carbon (AC2) electrode discs. A non-aqueous electrolyte with a lithium salt was used. The symmetrtic supercapacitor cells were cycled between about 1.25 and 2.50 volts at a 10 C rate at room temperature. The thicker $V_2O_5$ coated activated carbon 1 (410 Å) supercapacitor cell showed a capacity increase two times that of the uncoated supercapacitor cell having uncoated activated carbon.

Figure 3:
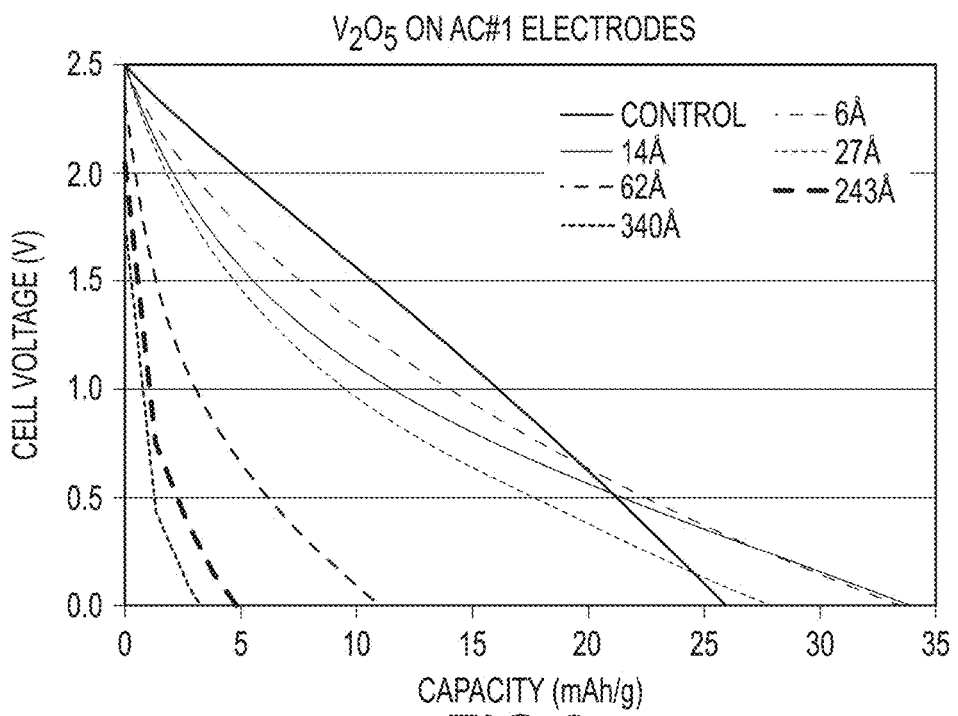
FIG. 3 depicts voltage profiles of an activated carbon and atomically deposited vanadium oxide ($V_2O_5$) coated electrode according to some embodiments of the present disclosure.

Supercapacitor cells having atomic layer deposited $V_2O_5$ on other activated carbons, such AC1, with different coating thicknesses were also evaluated. These samples were used in symmetric supercapacitor cells with a non-aqueous electrolyte. FIG. 3 shows voltage profiles of for the different $V_2O_5$ thicknesses and the uncoated activated carbon (AC1) control. The coatings having a thickness of about 14 Å or less showed a net but limited capacity gain of about 30% more than the uncoated activated carbon control. The coating having a thickness of more than about 14 Å showed reduced capacity. The reduced capacity is believed to be due to pore blocking from the oxides.

Figure 4A:
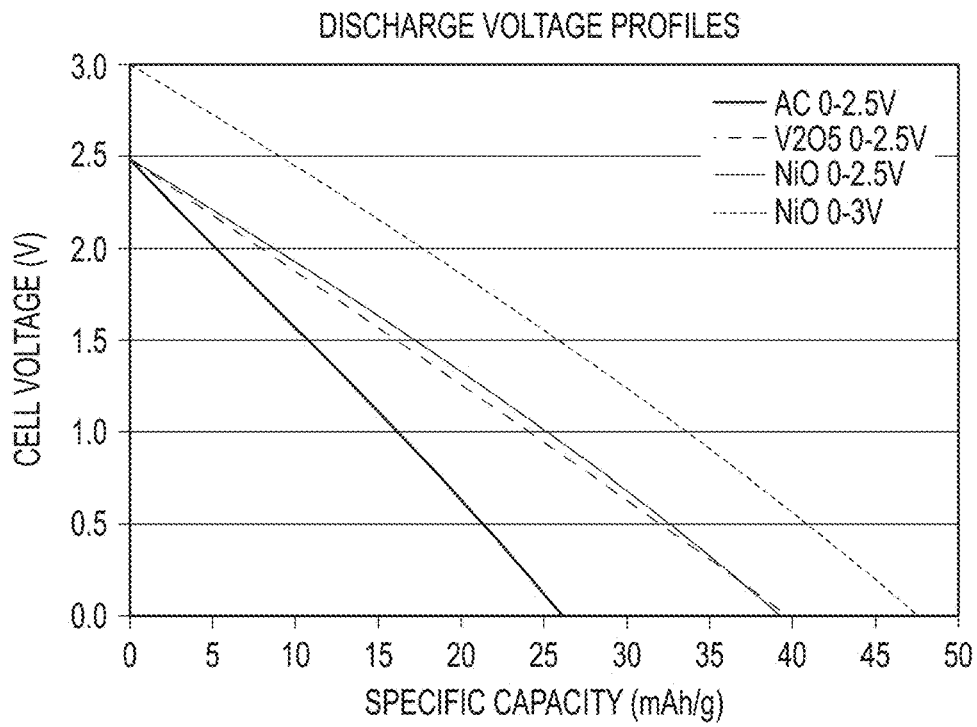
FIG. 4A depicts voltage profiles of symmetric pseudocapacitor cells according to some embodiments of the present disclosure at different voltage ranges.

FIG. 4A shows a comparison of voltage profiles of an uncoated activated carbon control and atomic layer deposited transition metal oxide coated symmetric ultracapacitor cells operated at different voltage ranges (as indicated). The symmetric pseudocapacitor cells operated over a voltage range from about 0 to about 2.5 V (volts), used a lithium ion battery baseline electrolyte, 1M $LiPF_6$ in a carbonate solvent mixture. The atomic layer deposited $V_2O_5$ and NiO samples delivered more than about 50% specific capacity or capacitance improvement (based on cathode active material weight) over the uncoated activated carbon powder control sample. When an atomic layer deposited NiO sample was operated over a voltage range from about 0 to about 3 volts using a 1M tetraethylammonium tetrafluoroborate, $TEABF_4$, in polycarbonate solvent, an additional 20% specific capacity increase was observed versus that at about 0 to about 2.5 volts, or, about 90% specific capacity increase versus the activated carbon control.

Figure 4B:
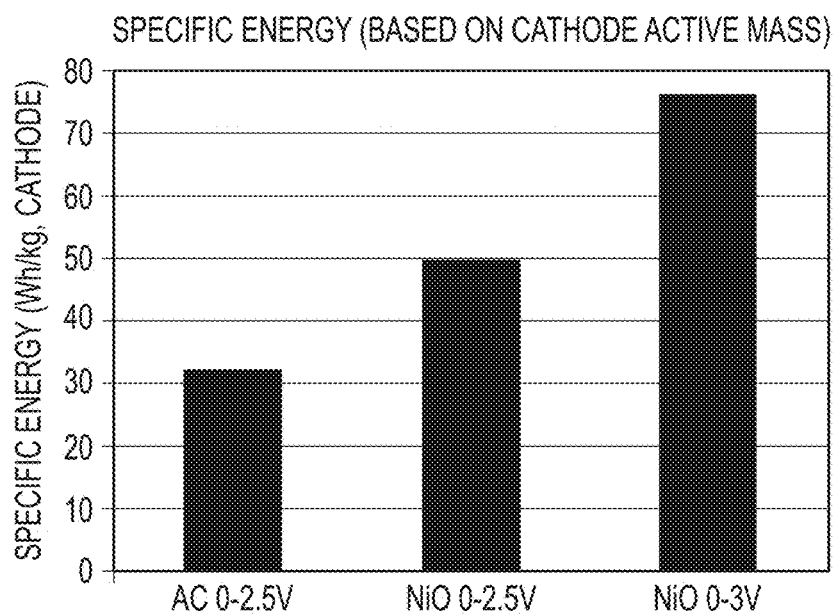
FIG. 4B depicts specific energy profiles of symmetric pseudocapacitor cells according to some embodiments of the present disclosure.

FIG. 4B shows a comparison of specific energies for the uncoated activated carbon control and atomic layer deposited NiO symmetric ultracapacitor cells operated at the indicated voltage ranges. The atomic layer deposited NiO coated symmetric ultracapacitor cells displayed a specific energy enhancement of more than about 60%, when compared to the activated carbon control symmetric ultracapacitor cell, over the voltage range of about 0 to about 2.5 volts. When cycled over a wider voltage range of about 0 to about 3 volts, the atomic layer deposited NiO symmetric ultracapacitor cells showed an increase in specific energy, to a value of about 76 Wh/kg (based on the cathode active mass). This corresponds to a projected cell level value of about 24 Wh/kg, which represented a specific energy enhancement of about 50%. This is believed to be due to the voltage increase, or, a total specific energy enhancement of about 130%, due to pseudocapacitive effect and voltage increase, when compared to the activated carbon symmetric ultracapacitor control.

Figure 4C:
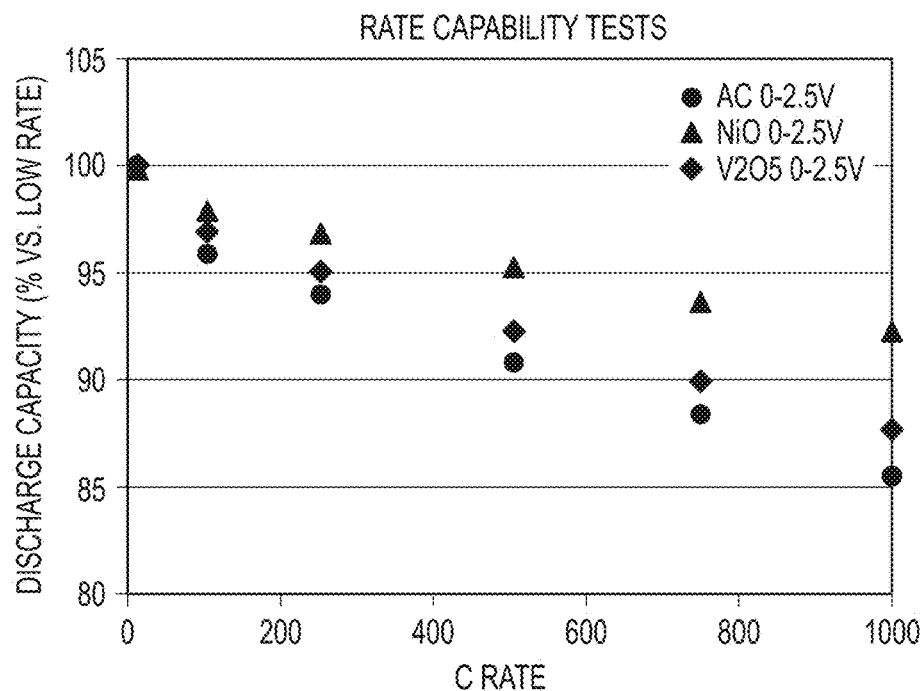
FIG. 4C depicts rate capacity tests of symmetric pseudocapacitor cells according to some embodiments of present disclosure at various C rates.

FIG. 4C shows a comparison of rate capability results in terms of discharge capacities at various C-rates, as referenced to a low C-rate (10 C) capacity. Placed in perspective, the 1000 C-rate is equivalent to about 27 $mA/cm^2$ or about 17 A/g current density. The atomic layer deposited $V_2O_5$ or NiO do not impact ultracapacitor rate performance. In fact, the atomic layer deposited metal oxide samples outperformed the uncoated activated carbon control sample. The best rate performance was observed from the atomic layer deposited NiO activated carbon powder based sample, which displayed a rate capability with more than about 92% discharge capacity retention at 1000 C-rate (17 A/g), over the same at 10 C-rate. This rate capability translates to about 14 kW/kg specific power on the cell level.

Figure 4D:
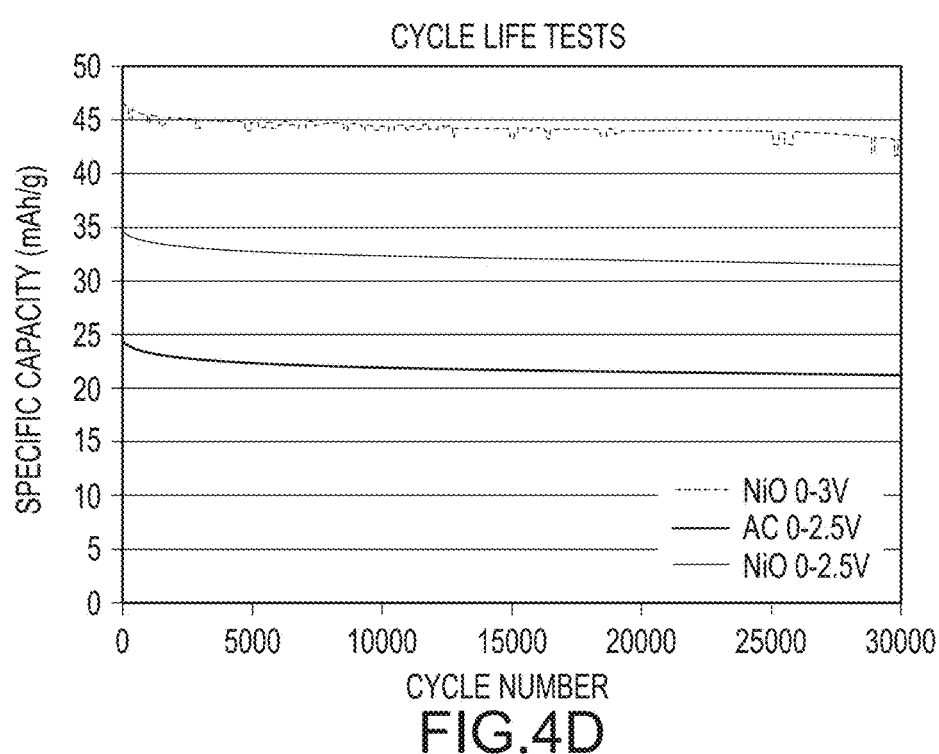
FIG. 4D depicts cyclic life performance rare capacity tests of symmetric pseudocapacitor cells according to some embodiments of present disclosure cycled at 100 C rate at various voltage ranges.

FIG. 4D shows a comparison of cycle life performance data, where an uncoated activated carbon control and an atomic layer deposited NiO coated sample were cycled at 100 C-rate in the voltage ranges indicated. When cycled from about 0 to about 2.5 volts, the atomic layer deposited NiO sample showed extremely stable cycle life of more than about 90% capacity retention after about 30 k cycles. This result was better than that of the uncoated activated carbon control (about 87%). The high voltage electrolyte $TEABF_4$-polycarbonate permitted the atomic layer deposited NiO sample to cycle at a higher voltage range (from about 0 to about 3 volts) without adversely impacting the long-term cycle performance. Moreover, the sample retained about 91% of its initial capacity after about 30 k cycles.

Figure 5A:
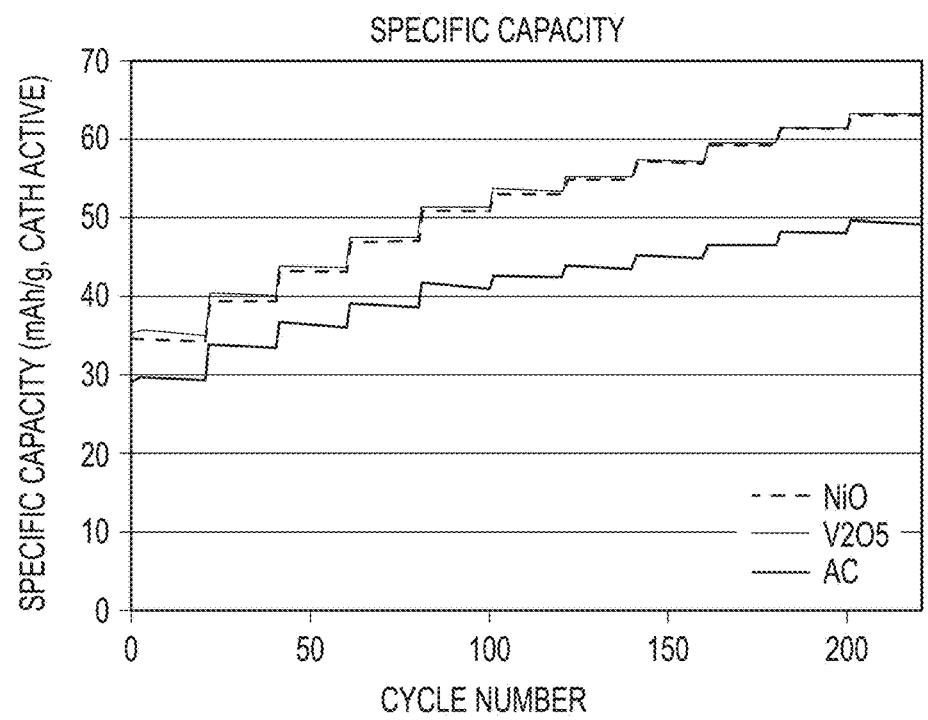
FIG. 5A depicts specific capacitance versus cycle number as a function of voltage scan of 0 to 4.0 V of symmetric pseudocapacitor cells having a TEABF, polycarbonate electrolyte according to some embodiments of the present disclosure.
Figure 5B:
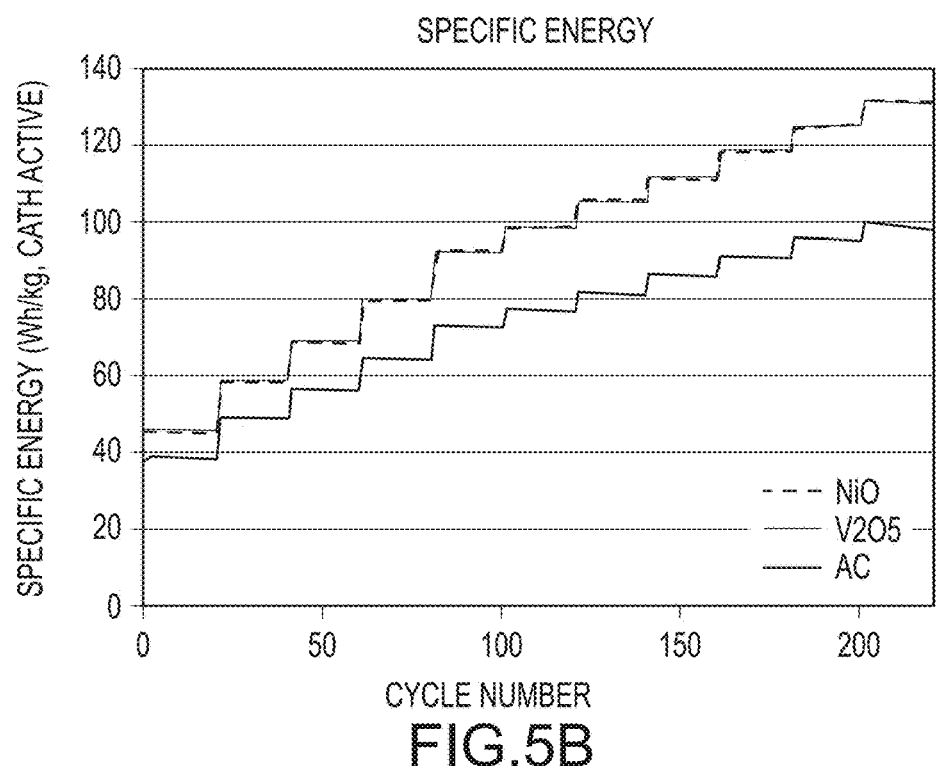
FIG. 5B depicts specific energy versus cycle number as a function of voltage scan of 0 to 4 V of symmetric pseudocapacitor cells having a TEABF, polycarbonate electrolyte according to some embodiments of the present disclosure.

Since the energy of an ultracapacitor is directly proportional to the square of voltage, $E=0.5 \, CV^2$, an increase in capacitor voltage provides a significant return in energy. This is exemplified in FIG. 5 where the specific capacity and energy are a function of the operating voltage ranges indicated. The symmetric ultracapacitors underwent about 20 cycles per voltage scan (from about 2.5 to about 4.0 volts). Specific capacity and specific energy increased progressively over a voltage scan up to about 4 V. Atomic layer deposited NiO and $V_2O_5$ samples displayed enhanced specific capacity and specific energy with a higher rate of increase than the uncoated activated carbon control. At about 4 volts, the atomic layer deposited metal oxide samples displayed a specific capacitance of about 114 F/g corresponding to a specific energy of more than about 30 Wh/kg (cell level). This represents about a three times increase in the specific energy at about 2.5 volts. This voltage scan data illustrates the importance of high voltage operation with regard to specific energy enhancement.

Figure 6A:
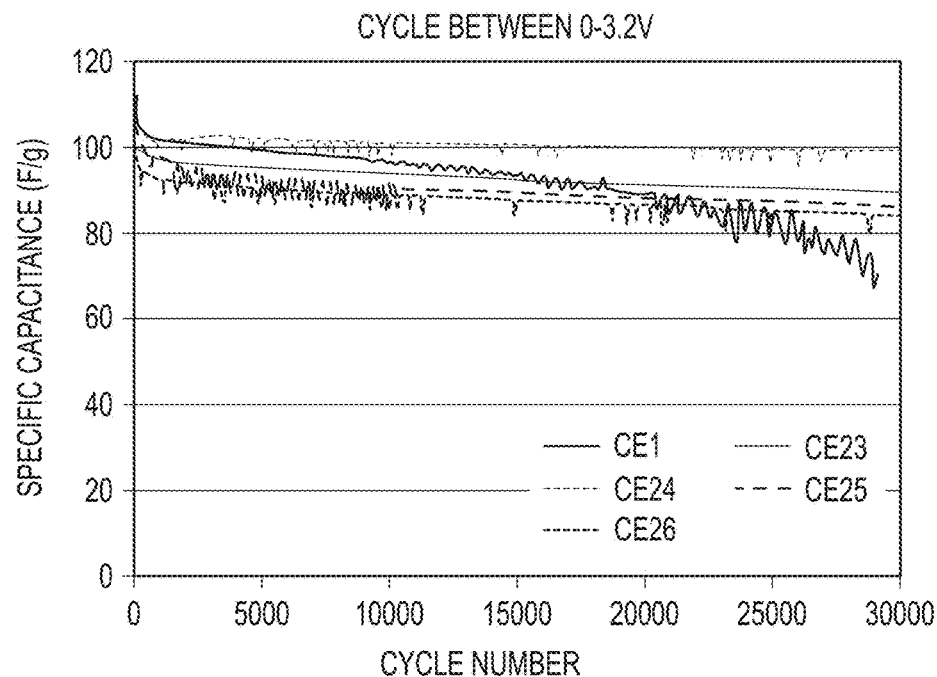
FIG. 6A depicts specific capacitance versus cycle number as a function of voltage scan of 0 to 3.2 V of pseudocapacitor cells having electrodes containing nickel oxide and activated carbon and different electrolytes according to some embodiments of the present disclosure.
Figure 6B:
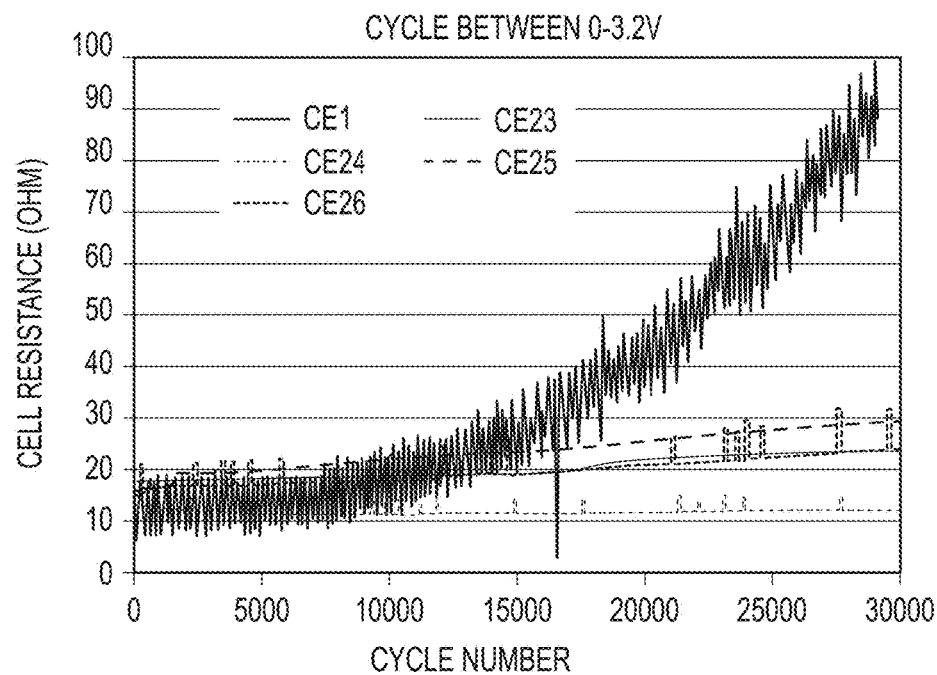
FIG. 6B depicts cell resistance versus cycle number as a function of voltage scan of 0 to 3.2 V of pseudocapacitor cells having electrodes containing nickel oxide and activated carbon and different electrolytes according to some embodiments of the present disclosure.

Atomic layer deposited 5 wt % NiO on activated carbon (AC1) electrodes were used to construct symmetric cells with different electrolytes. The symmetric cells were first cycled at about 10 C rate for about 5 cycles and then at about 100 C rate for extended cycle performance evaluation up to about 30 k cycles. FIGS. 6A and 6B show long-term cycle performance of these electrolytes at about 0 to about 3.2 volts. These symmetric cells were cycled at about 23.5 degrees Celsius±about 0.5 degrees Celsius. The electrolytes CE23-CE26 demonstrated excellent long-term cycle stability (at about 30 k cycles, FIG. 6A), evidenced from capacitance retention and cell resistance ($R_{dc}$) growth trend cycled between about 0 to about 3.2 volts (FIG. 6B). Electrolytes CE23-CE26 displayed improved stability during long-term cycling between about 0 to about 3.2 volts, when compared to the control electrolyte CE1.

Figure 7A:
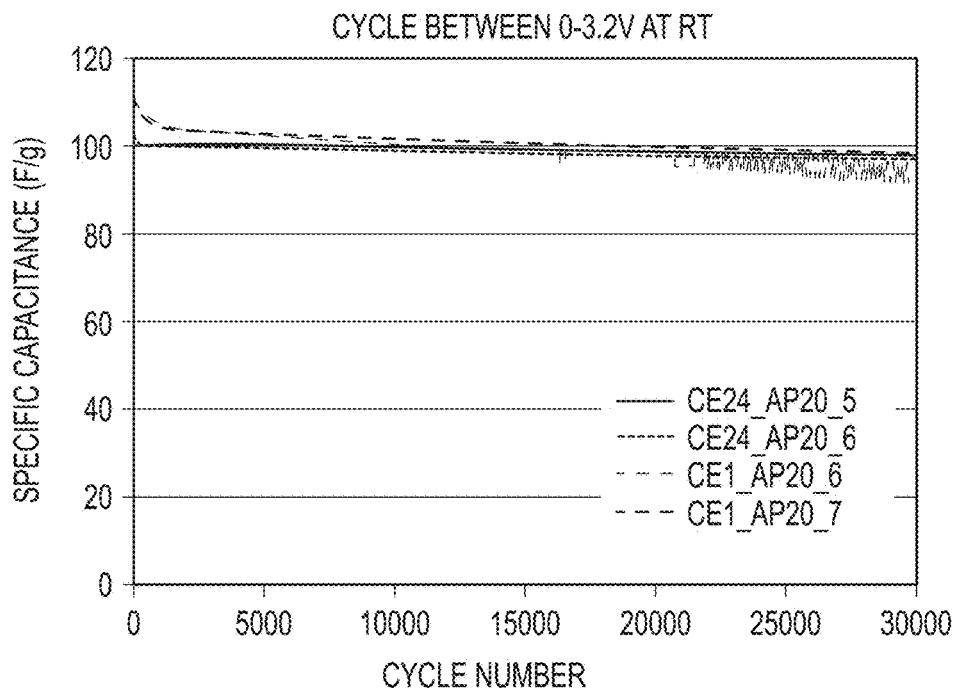
FIG. 7A depicts specific capacitance versus cycle number as a function of voltage scan of 0 to 3.2 V of pseudocapacitor cells having activated carbon electrodes and different electrolytes according to some embodiments of the present disclosure.
Figure 7B:
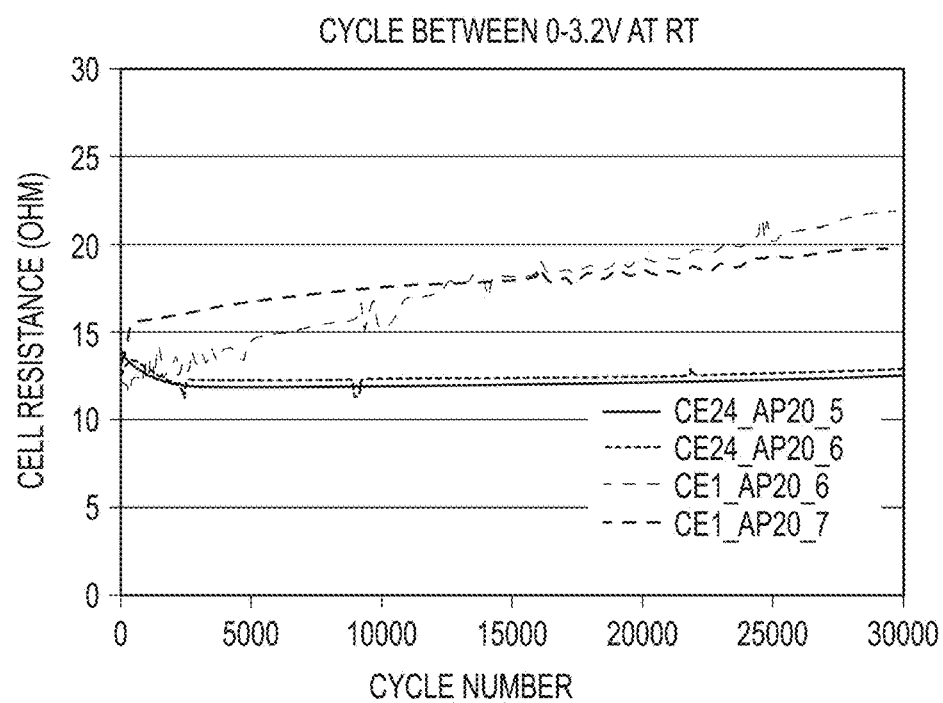
FIG. 7B depicts cell resistance versus cycle number as a function of voltage scan of 0 to 3.2 V of pseudocapacitor cells having activated carbon electrodes and different electrolytes according to some embodiments of the present disclosure.

Activated carbon electrodes were used in symmetric cells replicate cells for long-term cycle evaluations with CE1 and CE24 electrolytes. Cycling was performed from about 0 to about 3.2 volts and at about 23.5±0.5 degrees Celsius. The symmetric cell specific capacitance and $R_{dc}$ versus cycle number data are depicted in FIGS. 7A and 7B. Electrolyte CE24 displayed improved long-term cycle stability compared to that of CE1, when cycled between about 0 to about 3.2 volts for about 30 k cycles. This result is also illustrated in the cell resistance versus cycle number data trends (FIG. 7B). The lower cell resistance observed in cells having the CE24 electrolyte was also notable.

Asymmetric Supercapacitor Cells

Compared to uncoated activated carbon powder-based asymmetric supercapacitor cells, metal oxide atomic layer deposited activated carbon asymmetric supercapacitor cells generally have higher rate capacitance delivery with improved cycle life stability.

Different metal oxide candidates were applied at a concentration of about 10 wt % in different particle size regimes, including $MnO_2$ (greater than micro), NiO (about nano), $V_2O_5$ (micro or more) and $TiO_2$ (about nano). Source and average particle size of activated carbon and metal oxides are listed in Table 3. Each metal oxide candidate was mixed with activated carbon (commercial AP20) in a slurry mixing process. The resultant mixture was then slurry coated onto an aluminum substrate, and utilized as cathodes in a hybrid design. A pre-lithiated graphite electrode was used as the anode. A lithium ion battery electrolyte, 1M $LiPF_6$ in carbonate solvent mix, was used in the hybrid pseudocapacitor cells. Cells were first formed between about 1.0 to about 4.0 volts or from about 1.2 to about 4.0 volts for a number of cycles. The asymmetric supercapacitor cells were then evaluated between about 1.2 to about 4.0 volts.

TABLE 3

| Sample | Source | Particle Size |
|---|---|---|
| AC (AP20) | Commercial | 11.4 μm |
| 10% $V_2O_5$ | In-House | >micron |
| 10% NiO | Commercial | 20 nm |
| 10% $MnO_2$ | Commercial | >micron |
| 10% $TiO_2$ | Commercial | 5 nm |

Figure 8:
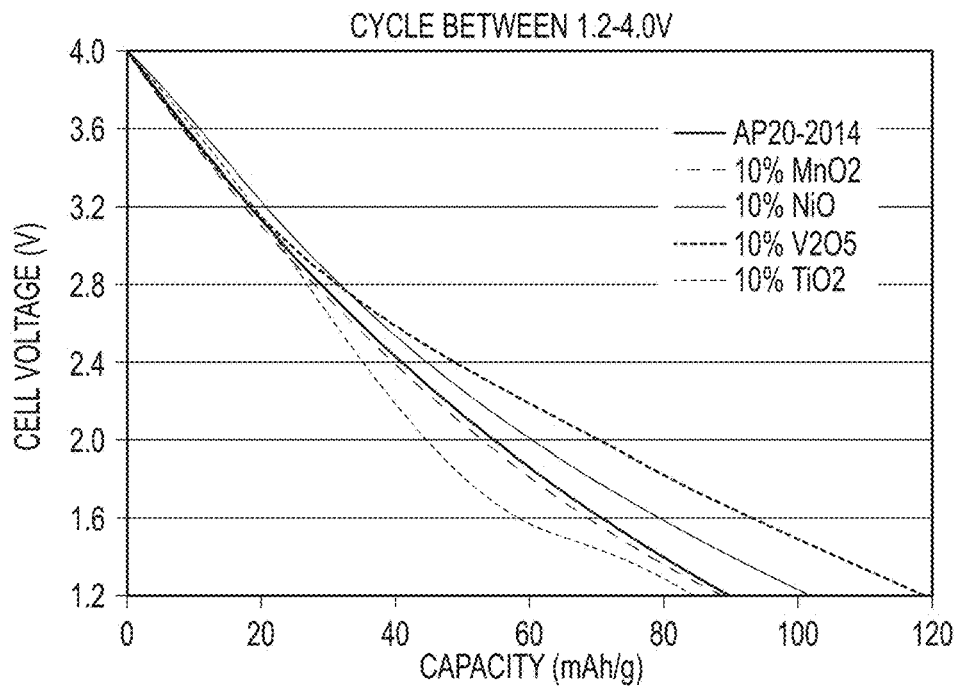
FIG. 8 depicts voltage versus specific capacity for asymmetric hybrid pseudocapacitor and control cells according to some embodiments of the present disclosure.

FIG. 8 shows cell voltage versus capacity for the asymmetric hybrid pseudocapacitor cells and a control cell cycled between about 1.2 to about 4.0 volts. These cells were formed for a few cycles between about 1.0 to about 4.0 volts. The cells with about 10 wt % NiO and $V_2O_5$ showed a specific capacity increase of about 14% and 34%, respectively, compared with the AP20 electrode (control) without metal oxide (Table 4A). The cell having about 10 wt % nano $TiO_2$ showed a discharge curve with two different slopes and a comparable specific capacity to the control cell. The cell having about 10 wt % $MnO_2$ showed a nearly identical discharge curve and specific capacity compared with the control cell (AP20), which is believed result from the relatively large particle size. In the case of NiO and $V_2O_5$ mixing, the specific capacity enhancement is believed to result from the intercalation and pseudocapacitive contributions of the metal oxides. The nano-sized metal oxides are believed to give rise to pseudocapacitive contributions whereas the large particles tend to reduce their pseudocapacitive capability.

The preliminary hybrid pseudocapacitor data illustrated a substantial leap in specific capacitance (Table 4A) and specific energy gains (Table 4B). The 10% nano NiO cell level specific energy is estimated to be about 50 Wh/kg, an increase over the activated carbon control of about 14%. The 10% micro $V_2O_5$ cell level specific energy is estimated to be 56 Wh/kg, an increase over the activated carbon control of about 27%. Hence, atomic layer deposition can be a method to coat nano-sized metal oxides onto high surface area activated carbon. The atomic layer deposited metal oxide coating can maintain high rate capability and long cyclability and increase the specific capacity.

TABLE 4A

| | Specific Capacity (cathode active weight) | | Specific Capacitance (cathode active weight) | |
|---|---|---|---|---|
| Sample | mAh/g | vs. AP20 | F/g | vs. AP20 |
| AP20 | 89.2 | 1.00 | 267.6 | 1.00 |
| 10% $V_2O_5$ | 121.8 | 1.37 | 366.4 | 1.37 |
| 10% NiO | 101.8 | 1.14 | 305.4 | 1.14 |
| 10% $MnO_2$ | 88.6 | 0.99 | 265.8 | 0.99 |
| 10% $TiO_2$ | 84.6 | 0.95 | 253.8 | 0.95 |

TABLE 4B

| | Specific Energy (cathode active weight) | | Estimated Specific Energy (cell level) | |
|---|---|---|---|---|
| Sample | Wh/kg | vs. AP20 | Wh/kg | vs. AP20 |
| AP20 | 214.2 | 1.00 | 44 | 1.00 |
| 10% $V_2O_5$ | 282.1 | 1.32 | 56 | 1.27 |
| 10% NiO | 240.0 | 1.12 | 50. | 1.14 |
| 10% $MnO_2$ | 209.6 | 0.98 | — | — |
| 10% $TiO_2$ | 205.0 | 0.96 | — | — |

Table 5 summarizes the inductive coupled plasma analysis results for NiO on activated carbon samples. Trials with target final loading of about 10% were attempted but about 0.9% loading NiO was identified by inductive coupled plasma analysis (N1). To address this discrepancy, the reactor vessel was reconfigured and atomic layer deposition method iterations were investigated. These efforts culminated in a final powder product with a nickel metal content of 123,000 ppm. This concentration of nickel metal corresponds to about 15.7% loading of NiO on activated carbon powder (N2).

TABLE 5

| Sample | Ni (ppm) | NiO (%) |
|---|---|---|
| N1 | 6,900 | 0.9 |
| N2 | 123,000 | 15.7 |

The 15.7 wt % NiO on activated carbon powder sample (N2) was slurry coated onto carbon coated aluminum current collector foils, and the resultant cathode was utilized in asymmetric hybrid pseudocapacitor cells. A pre-lithiated graphite electrode was used as the anode. A lithium ion battery electrolyte, 1M $LiPF_6$ in carbonate solvent mix, was used in the hybrid pseudocapacitor cells. The hybrid pseudocapacitor cell were first formed between about 1.0 to about 4.0 volts and then between about 1.2 to about 4.0 volts for a number of cycles. The hybrid pseudocapacitor cells were thereafter evaluated between to about 1.2 to about 4.0 volts.

Figure 9:
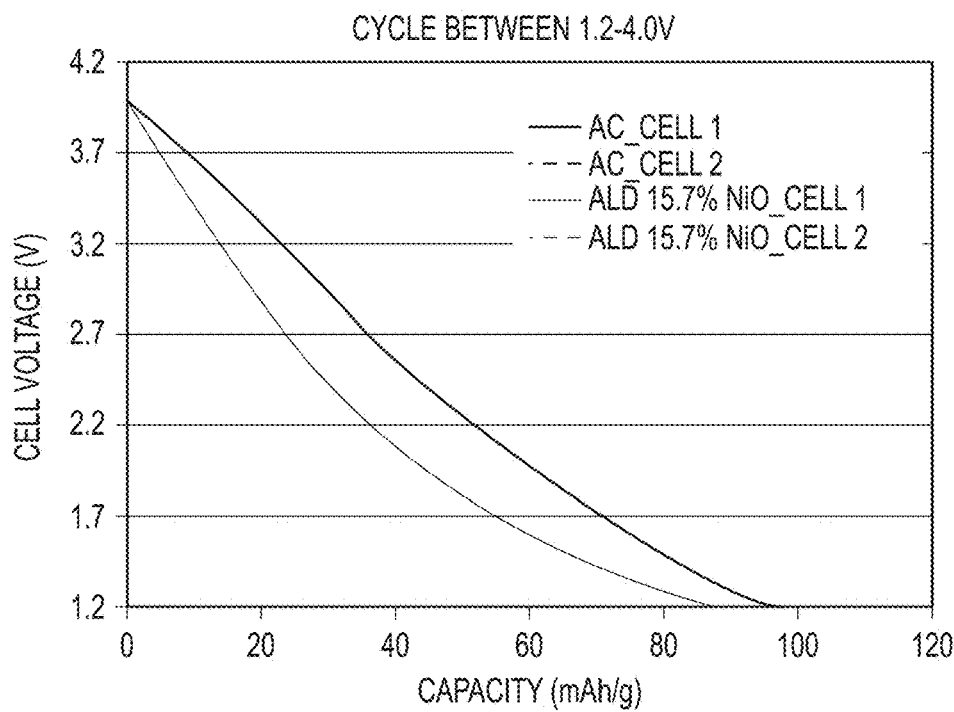
FIG. 9 depicts formation discharge voltage versus specific capacity for asymmetric, hybrid pseudocapacitor cells having electrodes comprising nickel oxide (NiO) and activated carbon and control cells having activated carbon electrodes according to some embodiments of the present disclosure.

FIG. 9 displays formation discharge voltage versus specific capacity data for the 15.7 wt % NiO on activated carbon and activated carbon control asymmetric hybrid pseudocapacitor cells. The hybrid pseudocapacitor cells containing NiO delivered lower specific capacity (about 9% lower or about 87 versus 96 mAh/g), specific capacitance (about 9% lower or about 225 versus 247 F/g) and specific energy (about 17% lower or about 192 versus 233 Wh/kg, all based on cathode active) than the control cells. The result suggested that there was a lack of a meaningful pseudocapacitive contribution from the 15.7 wt % NiO within the test regime.

Table 6 summarizes the inductive coupled plasma analysis results for the $V_2O_5$ on activated carbon and the activated carbon control samples.

$V_2O_5$ on activated carbon powder samples (V6-V10, VX2 and VX5) were slurry cast onto carbon coated aluminum current collector foil, and the resultant cathodes were utilized in the fabrication of asymmetric hybrid pseudocapacitor cells. A pre-lithiated graphite electrode was used as the anode. A lithium ion battery electrolyte, 1M $LiPF_6$ in carbonate solvent mix, was used in the hybrid pseudocapacitor cells. The hybrid pseudocapacitor cells were first formed between about 1.0 to about 4.0 volts, and thereafter between about 1.2 to about 4.0 volts for a number of cycles. The hybrid pseudocapacitor cells were then evaluated between about 1.2 to about 4.0 volts.

TABLE 6

| Sample | V (ppm) | $V_2O_5$ (%) |
| --- | --- | --- |
| Activated Carbon* | 4.6 | 0.001 |
| V1 | 14.9 | 0.003 |
| V2 | 14.5 | 0.003 |
| V3 | 140 | 0.025 |
| V4 | 720 | 0.129 |
| V5 | 227 | 0.041 |
| VX2 | 14,870 | 2.7 |
| VX5 | 24,392 | 4.3 |
| V9 | 64,800 | 11.6 |
| V6 | 95,000 | 17.0 |
| V10 | 118,400 | 21.1 |
| V7 | 123,000 | 22.0 |
| V8 | 168,000 | 30.00 |

*Control, devoid of any added vanadium oxide

Figure 10:
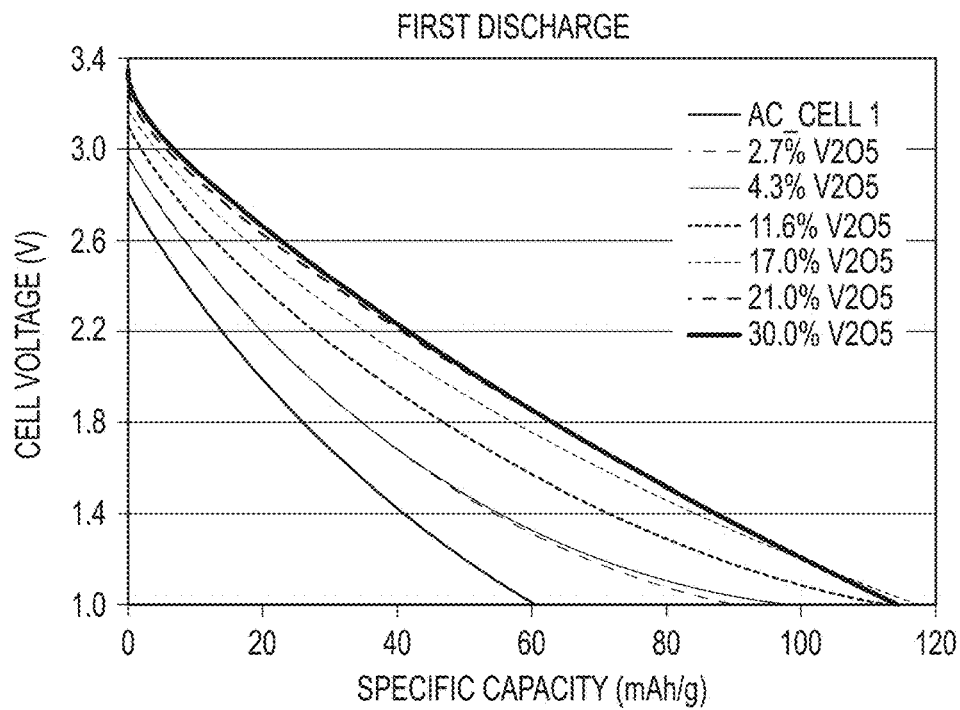
FIG. 10 depicts first discharge voltage versus specific capacity for asymmetric, hybrid pseudocapacitor cells having electrodes comprising vanadium oxide ($V_2O_5$) and activated carbon and control cells having activated carbon electrodes according to some embodiments of the present disclosure.

FIG. 10 shows first discharge voltage versus specific capacity data for the $V_2O_5$ on activated carbon and the activated carbon control asymmetric hybrid pseudocapacitor cells. The hybrid pseudocapacitor cells containing $V_2O_5$ demonstrated higher initial open circuit voltages than the activated carbon control cells. Higher initial open circuit voltages were observed with increasing $V_2O_5$ content. The hybrid pseudocapacitor cells containing $V_2O_5$ also demonstrated improved discharge specific capacities than the activated carbon control cells. Thus, the hybrid pseudocapacitor cells containing $V_2O_5$ demonstrated significant performance benefits.

Figure 11:
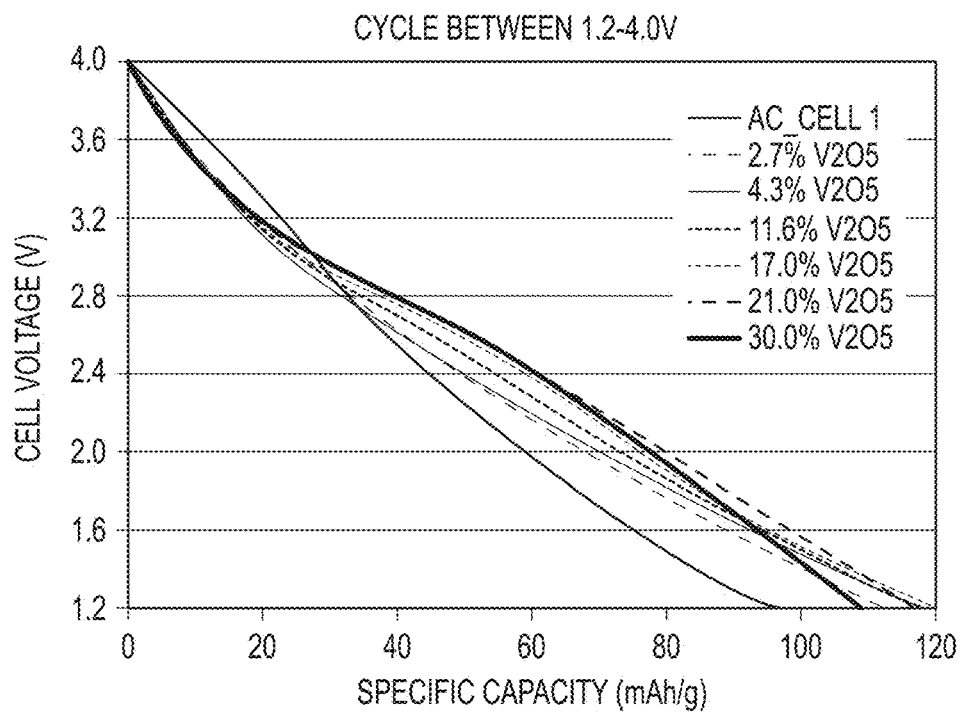
FIG. 11 depicts discharge voltage versus specific capacity for asymmetric, hybrid pseudocapacitor cells having electrodes comprising vanadium oxide ($V_2O_5$) and activated carbon and control cells having activated carbon electrodes according to some embodiments of the present disclosure.

FIG. 11 displays formation discharge voltage versus specific capacity for the $V_2O_5$-based and activated carbon control asymmetric hybrid pseudocapacitor cells. The $V_2O_5$-based, asymmetric hybrid pseudocapacitor cells demonstrated distinctly different discharge voltage profiles when compared to the control cells. The hybrid pseudocapacitor cells containing $V_2O_5$ demonstrated higher specific capacity/capacitance and average discharge voltage, which translates to substantially improved specific energy.

Table 7 summarizes the specific energy (based on cathode active mass) for hybrid pseudocapacitor cells with and without $V_2O_5$. Maximum specific capacity and energy improvement was observed for the hybrid pseudocapacitor cells with about 20 wt % $V_2O_5$ loading. The increased specific capacity, capacitance and energy of $V_2O_5$-based asymmetric hybrid pseudocapacitor cells were attributed to pseudocapacitive contributions from the coated $V_2O_5$ on the activated carbon.

TABLE 7

| Cathode | Specific Capacity (mAh/g)* | vs. Activated Carbon | Specific Energy (Wh/Kg)* | vs. Activated Carbon |
| --- | --- | --- | --- | --- |
| Activated Carbon | 96.2 | 1.00 | 233.2 | 1.00 |
| 2.7% $V_2O_5$ | 116.4 | 1.21 | 271.3 | 1.16 |
| 4.3% $V_2O_5$ | 117.7 | 1.22 | 272.4 | 1.17 |
| 11.8% $V_2O_5$ | 116.6 | 1.21 | 274.3 | 1.18 |
| 17.0% $V_2O_5$ | 119.3 | 1.24 | 283.9 | 1.22 |
| 21.0% $V_2O_5$ | 120.3 | 1.25 | 293.8 | 1.26 |
| 30.0% $V_2O_5$ | 106.3 | 1.10 | 266.3 | 1.14 |

*Cathode Active

Figure 12:
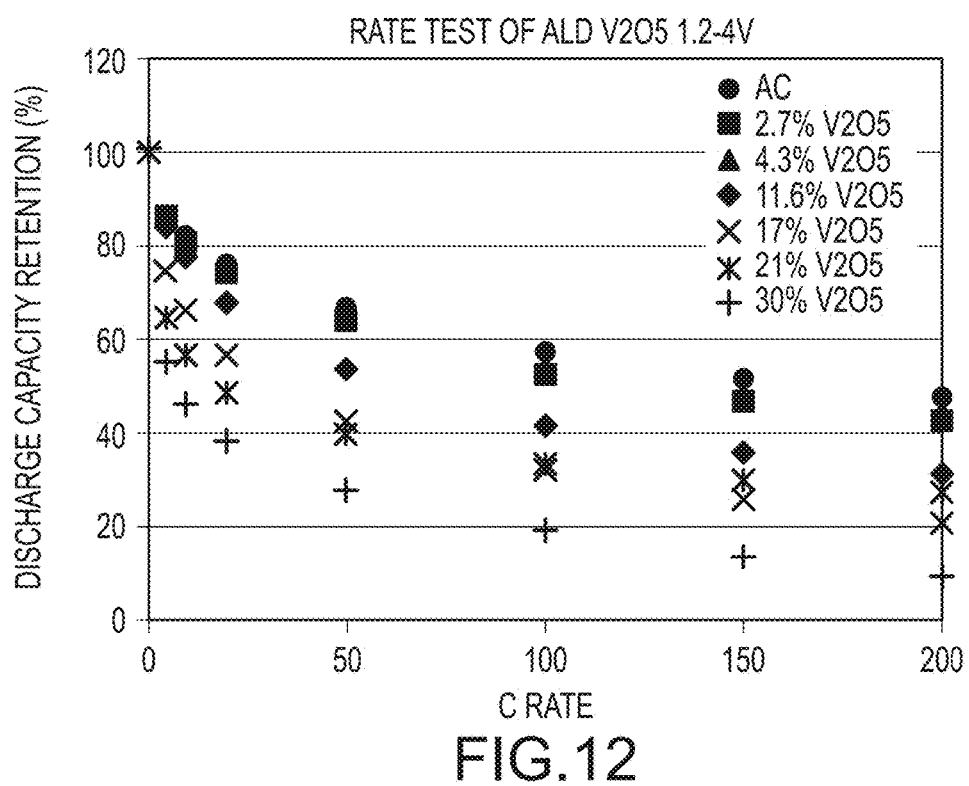
FIG. 12 depicts discharge capacity retention, referenced to a low rate (0.25 C) versus C-rate for asymmetric, hybrid pseudocapacitor cells having electrodes comprising vanadium oxide ($V_2O_5$) and activated carbon and control cells having activated carbon electrodes according to some embodiments of the present disclosure.

FIG. 12 displays discharge capacity retention, as referenced to a low rate (0.25 C-rate), versus C-rate of $V_2O_5$-based and an activated carbon control asymmetric hybrid pseudocapacitor cells. The evaluation was performed at room temperature. At 200 C-rate, the current density was observed to be equivalent to about 40 mA/cm$^2$ or about 17 A/g. Although there was an initial capacity retention drop, the rate capability was observed to stabilize at higher C-rates (more than about 100 C-rate) for all $V_2O_5$ loading levels. Samples based on lower $V_2O_5$ loadings (that is, less than about 4.3 wt %) were observed to display comparable rate capabilities to the activated carbon control cells. For 4.3 wt % $V_2O_5$ based cells (see FIG. 12), a specific power of about 4.5 kW/kg at the cell level, at 200 C-rate.

Figure 13A:
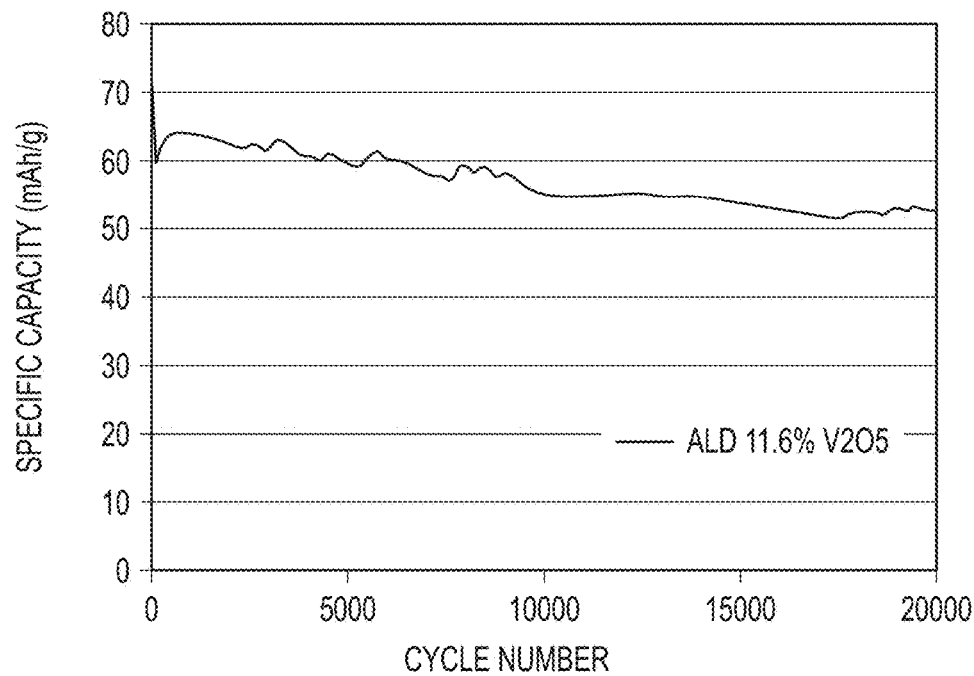
FIG. 13A depicts discharge specific capacity versus cycle number for asymmetric, hybrid pseudocapacitor cells having electrodes comprising vanadium oxide ($V_2O_5$) and activated carbon according to some embodiments of the present disclosure.
Figure 13B:
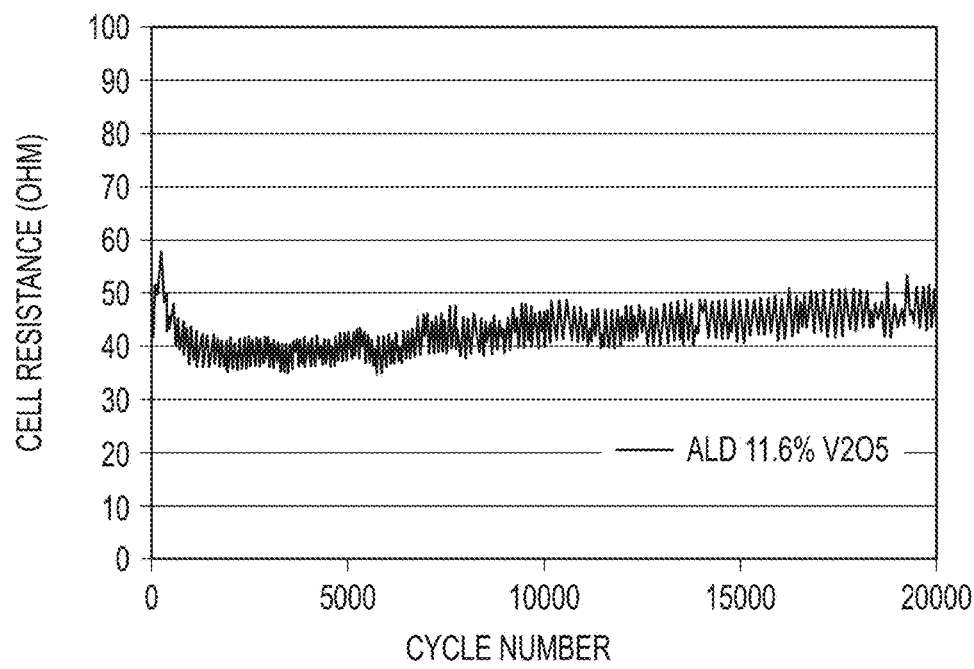
FIG. 13B depicts (cell resistance versus cycle number for asymmetric, hybrid pseudocapacitor cells having electrodes comprising vanadium oxide ($V_2O_5$) and activated carbon according to some embodiments of the present disclosure.

Life cycle performance evaluations were performed on $V_2O_5$-based asymmetric hybrid pseudocapacitor cells. In general, these hybrid pseudocapacitor cells displayed faster capacity fade with increased number of cycles (not shown). However, hybrid pseudocapacitor cells comprised from about 11.6 wt % $V_2O_5$ displayed very stable cycle life performance beyond 20k cycles. FIG. 13A shows discharge specific capacity versus cycle number of the 11.6 wt % $V_2O_5$ based asymmetric hybrid pseudocapacitor cell. The hybrid pseudocapacitor cell was cycled at about 10 C-rate at about room temperature and at a voltage range from about 1.2 to about 4.0 volts. The hybrid pseudocapacitor cell with about 11.6 wt % $V_2O_5$ showed a small capacity drop after about 100 cycles but the capacity first increased and then stabilized with extended (more than about 20 k) cycles. FIG. 13B shows cell resistance ($R_{dc}$) versus cycle number of a 11.6 wt % $V_2O_5$ based asymmetric hybrid pseudocapacitor cell. After an initial cell $R_{dc}$ rise, corresponding to the initial capacity drop, the $R_{dc}$ of the asymmetric hybrid pseudocapacitor cell with 11.6 wt % $V_2O_5$ was observed to fall and then stabilize at a steady $R_{dc}$ value over extended cycles, up to 20 k cycles. The steady cell resistance is consistent with the stable capacity retention versus cycle number.

Successive atomic layer layers were applied to activated carbon to provide pseudocapacitance for energy density improvement and a functional additional layer (metal oxides, fluorides, phosphates or lithium ion conducting solid electrolytes or potentially both) to enhance ionic conductivity and stability enhancement by an artificial solid electrolyte interface.

Two series of multifunctional samples (V9R- and V10R-series) were prepared as shown in Table 8. Multifunctional coated samples (V9R- and V10R-series) were slurry cast on carbon coated aluminum current collector foil, and the resultant cathodes were used in the fabrication of asymmetric hybrid pseudocapacitor cells. A pre-lithiated graphite electrode was used as the anode. A lithium ion battery electrolyte, 1M $LiPF_6$ in carbonate solvent mix, was used in the hybrid pseudocapacitor cells. The hybrid pseudocapacitor cells were first formed between about

TABLE 8

| Sample Series | Sample | $V_2O_5$* | $Al_2O_3$* | $Li_2O$* | Li:Al (molar) |
|---|---|---|---|---|---|
| Control | Activated Carbon | 0.001% | — | — | |
| V9R | V9R | 14.3% | — | — | |
| | V9R-A | 9.5% | 5.7% | — | 0.6:1 |
| | V9R-L | 9.9% | 5.8% | 1.0% | |
| V10R | V10R | 20.6% | — | — | |
| | V10R-A | 19.3% | 10.9% | — | |
| | V10R-L | 17.3% | 10.3% | 3.1% | 1.02:1 |

*ICP Result 1.0 to about 4.0 volts, and thereafter between about 1.2 to about 4.0 volts for a number of cycles. The hybrid pseudocapacitor cells were then evaluated between about 1.2 to about 4.0 volts.

Figure 14A:
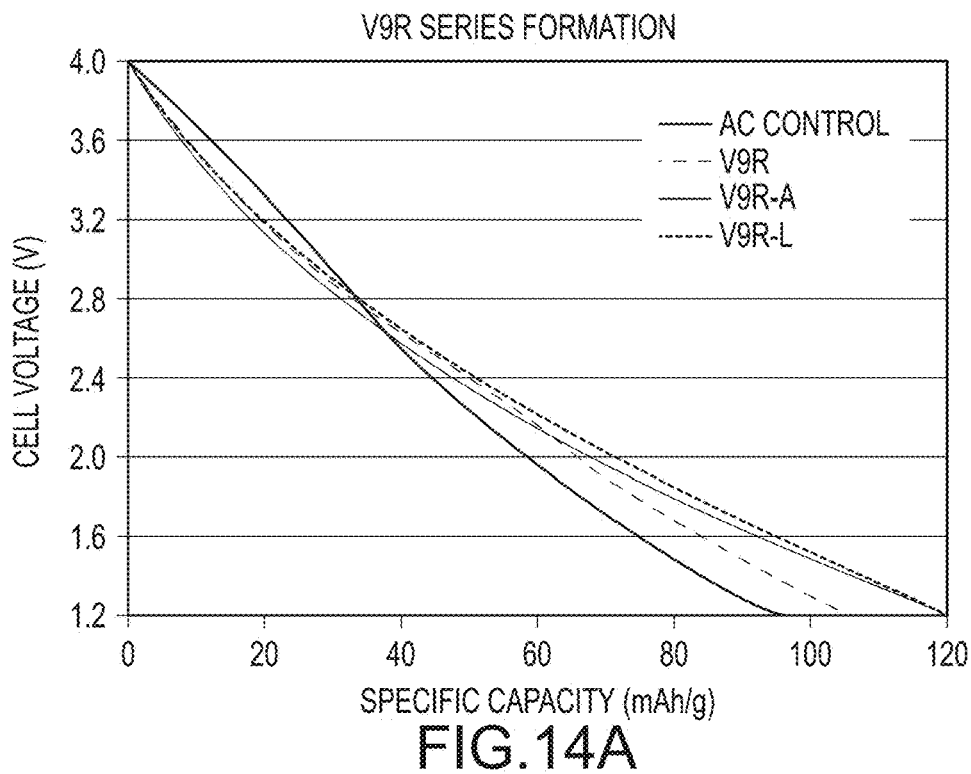
FIG. 14A depicts discharge voltage versus specific capacity for asymmetric, hybrid pseudocapacitor cells according having electrodes according to the V9R series of Table 8 and activated carbon control electrodes according to some embodiments of the present disclosure.
Figure 14B:
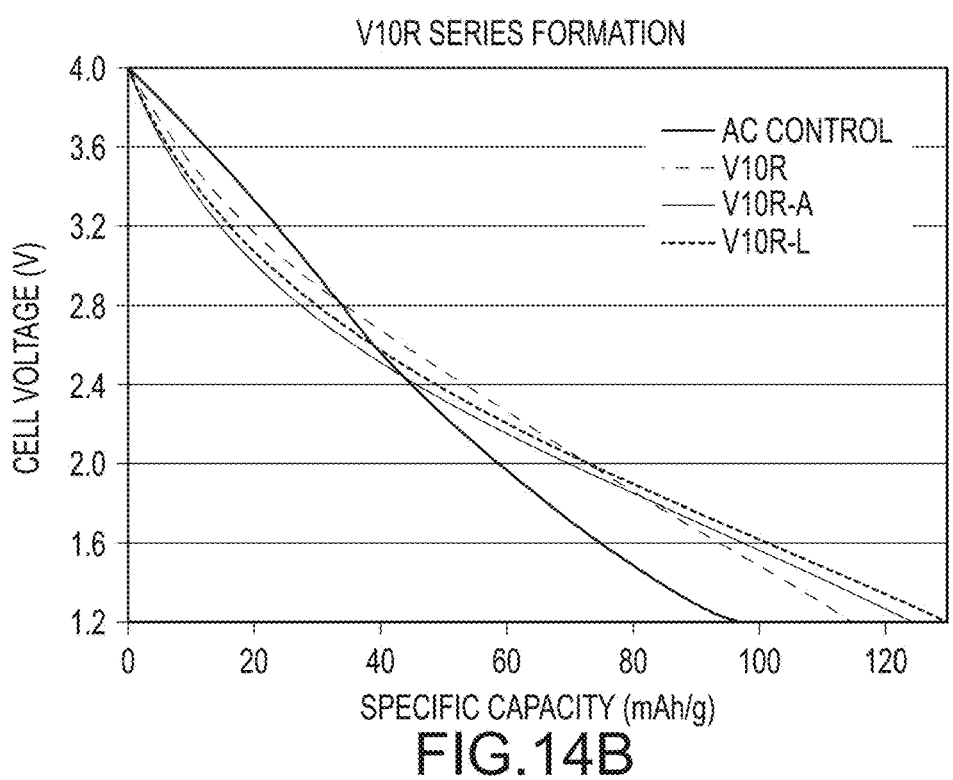
FIG. 14B depicts Discharge voltage versus specific capacity for asymmetric, hybrid pseudocapacitor cells according having electrodes according to the V10R series of Table 8 and activated carbon control electrodes according to some embodiments of the present disclosure.
Figure 15A:
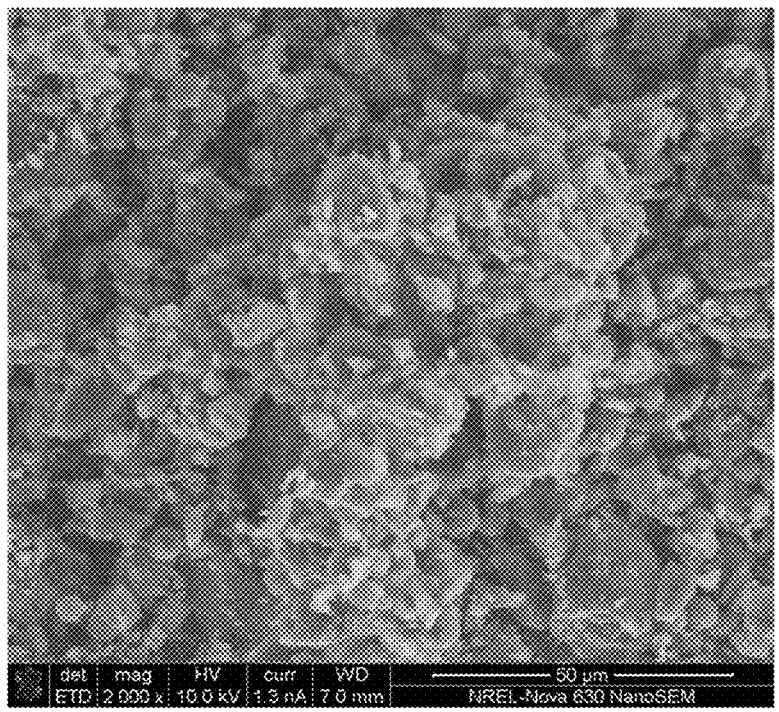
FIG. 15A depicts a scanning electron microscope image of an activated carbon powder sample according to some embodiments of the present disclosure.
Figure 15B:
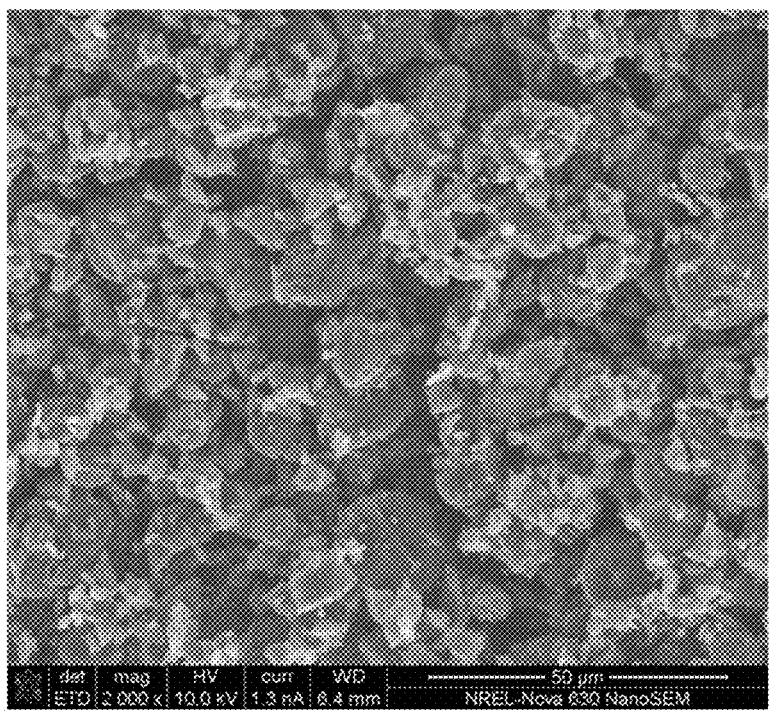
FIG. 15B depicts a scanning electron microscope image of a powder sample containing a V9R series composition according to some embodiments of the present disclosure.
Figure 15C:
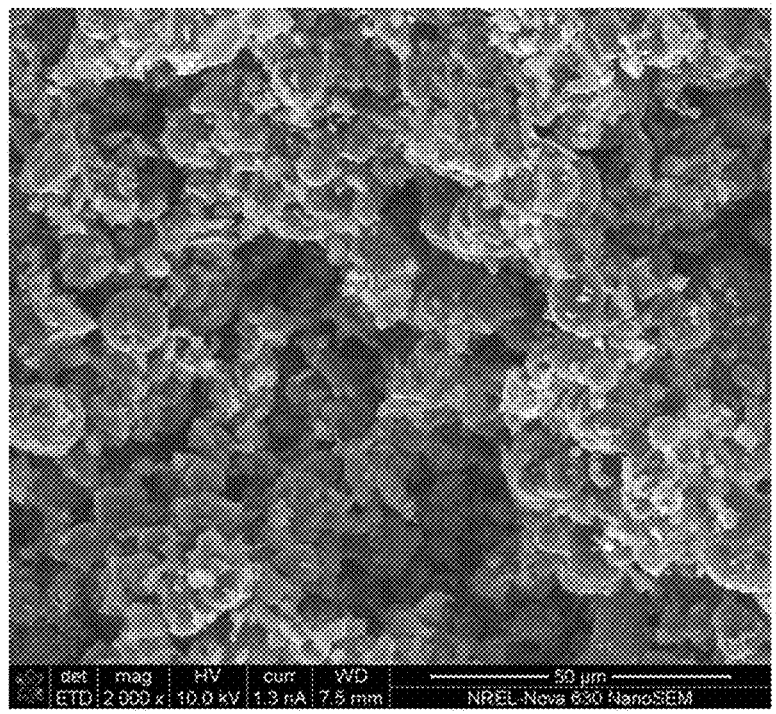
FIG. 15C depicts a scanning electron microscope image of a powder sample containing a V9R-A series composition according to some embodiments of the present disclosure.
Figure 15D:
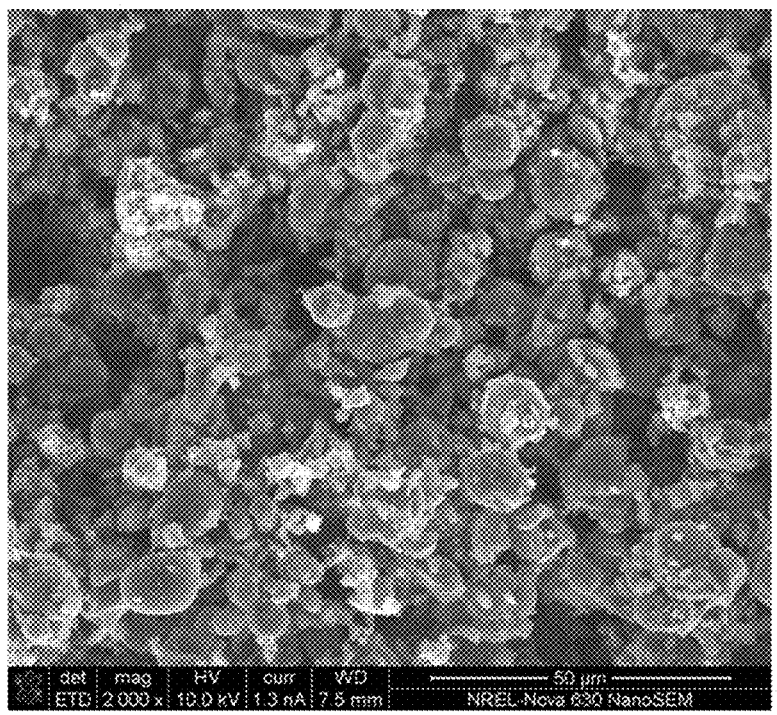
FIG. 15D depicts a scanning electron microscope image of a powder sample containing a V9R-L series composition according to some embodiments of the present disclosure.
Figure 16A:
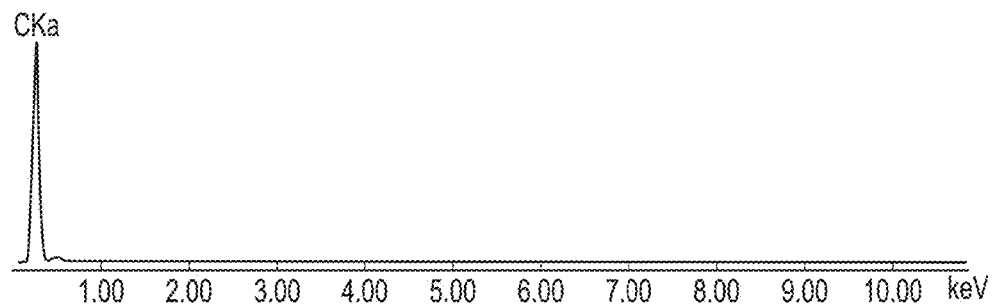
FIG. 16A depicts an electron dispersive x-ray analysis of an activated carbon powder sample according to some embodiments of the present disclosure.
Figure 16B:
FIG. 16B depicts an electron dispersive x-ray analysis of a powder sample containing a V9R series composition according to some embodiments of the present disclosure.
Figure 16C:
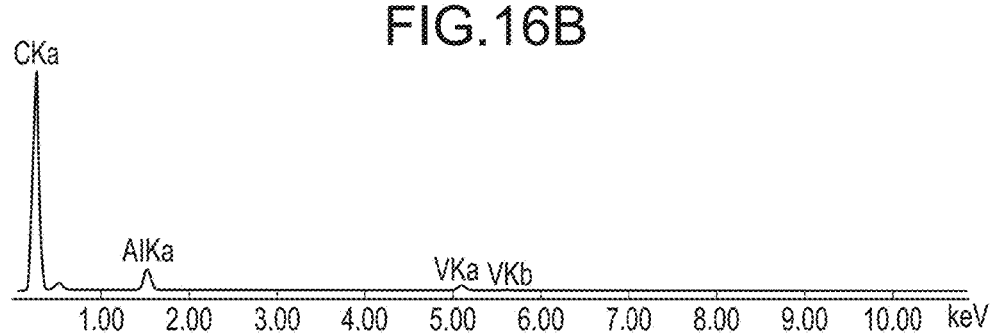
FIG. 16C depicts an electron dispersive x-ray analysis of a powder sample containing a V9R-A series composition according to some embodiments of the present disclosure.
Figure 16D:
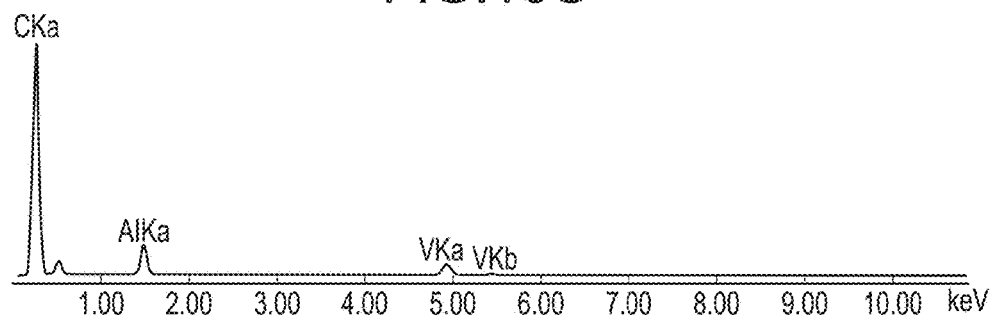
FIG. 16D depicts an electron dispersive x-ray analysis of a powder sample containing a V9R-L series composition according to some embodiments of the present disclosure.

FIGS. 14A and 14B show discharge voltage versus specific capacity of multifunctional coating-based asymmetric hybrid pseudocapacitor cells: (a) V9R-series and (b) V10R-series versus control cells. The V9R- and V10R-series based asymmetric hybrid pseudocapacitor cells displayed distinctly different discharge voltage profiles, and delivered higher specific capacity and average discharge voltage than the activated carbon control cells. It is interesting to note that multifunctional coatings (A=$Al_2O_3$, L=$LiAlO_x$) enabled higher specific capacities of the resultant asymmetric hybrid pseudocapacitor cells than cells based on $V_2O_5$ coating only.

The beneficial effect of the application of successive multifunctional coatings represents an improvement to high performance asymmetric ultracapacitors. Asymmetric hybrid pseudocapacitor cells with an additional functional layer coating (i.e., $Al_2O_3$ or $LiAlO_x$) delivered a higher specific energy, when compared to cells with a pseudocapacitive $V_2O_5$ layer coating. While not wanting to be limited by theory additional functional layers may participate in the Faradic charge transfer process (pseudocapacitance), enhance the ionic conductivity of an activated carbon cathode, or a combination thereof.

Also, cells comprised from active materials containing an additional functional layer coating also displayed a drastic improvement in cycle life stability, when compared to cells with a pseudocapacitive $V_2O_5$ layer coating. In specific, we observed a much more stable cell resistance against cycling. We attributed this improved cycle life performance to the presence of an artificial solid electrolyte interface (SEI) layer for enhanced cathode stability. This effect can be observed in the cycle data of cell resistance vs. cycle number FIG. 14B.

FIG. 15 shows scanning electron microscopy images of multifunctional coatings on V9R-series powder samples: (a) activated carbon baseline, (b) V9R, (c) V9R-A, and (d) V9R-L. The scanning electron microscopy images of coated activated carbon powders appear to have brighter contrasts for the particles due to electron charge difference of the coated powders, compared with the more uniform brightness of the uncoated activated carbon powder.

FIG. 16 shows energy dispersive x-ray spectroscopy analysis of multifunctional coatings on V9R-series powder samples: (a) activated carbon baseline, (b) V9R, (c) V9R-A, and (d) V9R-L. The energy dispersive x-ray spectrum of the uncoated activated carbon powder shows carbon signal only. The energy dispersive x-ray spectrum of V9R shows both carbon and vanadium. Energy dispersive x-ray spectra of V9R-A and V9R-L both show carbon (C), vanadium (V) and aluminum (Al). Lithium (Li) is not seen in the V9R-L powder sample most likely due to the fact that lithium is a light element which has a very low energy of characteristic radiation and is out of the sensitivity range of the energy dispersive x-ray detector used. The energy dispersive x-ray analyses, however, clearly show the intended multifunctional coatings on activated carbon powder, which is consistent with the inductive coupled plasma analysis.

What is claimed is:

1. A composition, comprising:
two or more active materials, wherein one of the two or more active materials comprises carbonaceous particles, wherein the carbonaceous particles comprise from about 50 to about 100 wt % of the composition, wherein the other of the two or more active materials comprise atomic deposition layers on the carbonaceous particles, wherein at least one of the other of the two or more active materials comprises a functional material, wherein the functional material comprises an ion conducting or solid electrolyte, and wherein the ion conducting material or a solid electrolyte is selected from the group consisting essentially of an alkali metal aluminum oxide, a lithium niobium oxide, an alkali metal fluoride, an alkali metal sulfide, an alkaline earth metal oxide, an alkaline earth fluoride, a Garnet ion conductor, and a mixture thereof.

2. The composition of claim 1, wherein the carbonaceous particles have an average surface area of about 50 $m^2/g$ or more.

3. The composition of claim 1, wherein each of the other of the two or more active materials is selected from the group consisting essentially of metal oxides, metal nitrides, metal sulfides, metal phosphates, polymers, and ion conducting or solid electrolytes, and a mixture thereof.

4. The composition of claim 1, wherein the atomic deposition layers are deposited on the carbonaceous particles consecutively.

5. The composition of claim 1, wherein the alkali metal aluminum oxide has a Li:Al molar ratio selected from the group consisting essentially of 1:1, 1.5:1, 2:1, 2.5:1, 3:1, 3.5:1, 4:1, 4.5:1 and 5:1.

6. The composition of claim 1, wherein the lithium niobium oxide comprises $Li_xNbO_y$, where x has a value from about 1 to about 5 and y has a value from about 3 to about 5.

7. The composition of claim 1, wherein the functional material is selected from the group consisting essentially of metal oxides, metal nitrides, metal sulfides, metal phosphates, polymers, and ion conducting or solid electrolytes, and a mixture thereof.

8. The composition of claim 7, wherein at least one of the other of the two or more active materials comprise a metal oxide and wherein the metal oxide is selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof.

9. The composition of claim 7, wherein the other of two or more active materials comprise atomic deposition layers are one or more of stacked one on top of the other, arranged side by side or a combination of stacked one on top of the other and side by side on the carbonaceous particles.

10. An electrochemical storage device, comprising:
a first electrode comprising:
a first current collector; and
a first composition comprising two or more first active materials, wherein one of the first active materials comprises a first plurality of carbonaceous particles, wherein the first plurality of carbonaceous particles comprises from about 50 to about 100 wt % of the first composition, and wherein the other of the two or more first active materials comprise a first set of atomic deposition layers on the first plurality of the carbonaceous particles;
first plurality of conductive carbon particles; and
a first polymeric binder, wherein the first polymeric binder, the first plurality of conductive particles and the first composition are adhered to the first current collector;
a second electrode comprising:
a second current collector;
a second composition comprising two or more second active materials, wherein one of the two or more second active materials comprises a second plurality of carbonaceous particles, wherein the second plurality of carbonaceous particles comprise from about 50 to about 100 wt % of the second composition, and wherein the other of the two or more second active materials comprises atomic deposition layers on the second plurality of carbonaceous particles;
a second plurality of conductive carbon particles; and
a second polymeric binder, wherein the second polymeric binder, the second plurality of the conductive carbon particles, and the composition are adhered to the second current collector; and
an electrolyte, wherein the electrolyte is in ionic contact with the first electrode and the second electrode; and
a separator positioned between the first and second electrodes and in ionic contact with the electrolyte,
wherein at least one of the two or more first active materials and/or the other of the two or more second active materials comprises a functional material, and wherein the functional material comprises an ion conducting material or a solid electrolyte selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof.

11. The electrochemical storage device of claim 10, wherein each of the first and second carbonaceous particles have an average surface area of about 50 $m^2/g$ or more.

12. The electrochemical storage device of claim 10, wherein the first set of atomic deposition layers are deposited on the first plurality of carbonaceous particles consecutively.

13. The electrochemical storage device of claim 10, wherein the functional material is selected from the group consisting essentially of metal oxides, metal nitrides, metal sulfides, metal phosphates, polymers, and ion conducting or solid electrolytes, and a mixture thereof.

14. The electrochemical storage device of claim 13, wherein at least one of the other of the two or more first active materials comprise a metal oxide and wherein the metal oxide is selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, NiO, $Ni(OH)_2$, $RuO_2$, $SiO_2$, $SnO_2$, $TiO_2$, $V_2O_5$, $Yb_2O_3$, ZnO, $ZrO_2$, and a mixture thereof.

15. The electrochemical storage device of claim 10, wherein the electrolyte is selected from the group consisting essentially of an aqueous electrolyte, a non-aqueous electrolyte, an aprotic organic liquid electrolyte, a room temperature ionic liquid electrolyte, a polymeric electrolyte, a polymeric gel electrolyte, a solid-state electrolyte, and a mixture thereof.

16. The electrochemical storage device of claim 15, wherein the electrolyte further comprises an additive selected from the group consisting essentially of vinylene carbonate, fluoroethylene carbonate, and a mixture thereof.

17. The electrochemical storage device of claim 15, wherein the aprotic organic liquid electrolyte comprises an electrolyte salt and an aprotic organic solvent.

18. The electrochemical storage device of claim 17, wherein the electrolyte salt is quaternary salt and wherein the quaternary salt is selected from the group consisting essentially of tetraethyl ammonium tetrafluoroborate, triethylmethylammonium tetrafluoroborate, spirobipyrrolidinium tetrafluoroborate, and a mixture thereof.

19. The electrochemical storage device of claim 17, wherein the aprotic organic solvent is selected from the group consisting essentially of nitrile, carbonate, ester, ether, sulfone, acetal, and a mixture thereof.

20. A composition, comprising:
two or more active materials, wherein one of the two or more active materials comprises carbonaceous particles and another of the two or more active materials comprises atomic deposition layers on the carbonaceous particles, wherein carbonaceous particles comprise from about 50 to about 100 wt % of the composition, wherein at least one of the atomic deposition layers comprises a solid electrolyte selected from the group consisting essentially of an alkali metal aluminum oxide, an alkali metal fluoride, an alkali metal sulfide, an alkaline earth metal oxide, an alkaline earth metal fluoride, a Garnet ion conductor, and a mixture thereof.

21. The composition of claim 20, wherein the at least one of the two or more active materials, other than the carbonaceous particles, is selected from the group consisting essentially of metal oxides, metal nitrides, metal sulfides, metal phosphates, polymers, and ion conducting or solid electrolytes, and a mixture thereof and wherein the carbonaceous particles have an average surface area of about 50 $m^2/g$ or more.

22. The composition of claim 20, wherein at least one of the two or more active materials, other than the carbonaceous particles, is selected from the group consisting essentially of metal oxides, metal nitrides, metal sulfides, metal phosphates, polymers, and ion conducting or solid electrolytes, and a mixture thereof.

23. The composition of claim 20, wherein the atomic deposition layers are deposited on the carbonaceous particles consecutively.

24. The composition of claim 20, wherein at least one of the two or more active materials, other than the carbonaceous particles, comprises a metal oxide and wherein the metal oxide is selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, and a mixture thereof.

25. The composition of claim 20, wherein at least one of the two or more active materials, other than the carbonaceous particles, comprises atomic deposition layers are one of stacked one on top of the other, arranged side by side, or a combination of stacked one on top of the other and side by side on the carbonaceous particles.

26. The composition of claim 20, wherein the at least one of the two or more active materials, other than the carbonaceous particles, comprises one or more of a metal oxide, a metal nitride, a metal sulfide, a metal phosphate, and a polymer.

27. An electrochemical energy storage device, comprising: a first electrode comprising:
   a first current collector; and a first composition comprising two or more first active materials, wherein one of the two or more first active materials comprises a first plurality of carbonaceous particles and another of the two or more first active materials comprises a first set of atomic deposition layers on the first plurality of the carbonaceous particles, wherein the first plurality of carbonaceous particles comprises from about 50 to about 100 wt % of the first composition;
   first plurality of conductive carbon particles; and
   a first polymeric binder, wherein the first polymeric binder, the first plurality of conductive particles and the first composition are adhered to the first current collector;
   a second electrode comprising:
   a second current collector; a second composition comprising two or more second active materials, wherein one of the two or more second active materials comprises a second plurality of carbonaceous particles and another of the two or more second active materials comprises a second set of atomic deposition layers on the second plurality of the carbonaceous particles, wherein the second plurality of carbonaceous particles comprise from about 50 to about 100 wt % of the second composition;
   a second plurality of conductive carbon particles; and
   a second polymeric binder, wherein the second polymeric binder, the second plurality of the conductive carbon particles, and second composition are adhered to the second current collector; and
   an electrolyte in ionic contact with the first electrode and the second electrode; and
   a separator positioned between the first and second electrodes and in ionic contact with the electrolyte,
   wherein at least one of the first and/or second composition further comprises an ion conducting electrolyte, selected from the group consisting essentially of an alkali metal aluminum oxide, an alkali metal fluoride, an alkali metal sulfide, an alkaline earth metal oxide, an alkaline earth fluoride, a Garnet ion conductor, and a mixture thereof.

28. The electrochemical storage device of claim 27, wherein the at least one of the first and/or second composition further comprises one or more of a metal oxide, a metal nitride, a metal sulfide, a metal phosphate, a polymer, and an ion conducting or solid electrolyte, and wherein each of the first and second carbonaceous particles have an average surface area of about 50 $m^2/g$ or more.

29. The electrochemical storage device of claim 27, wherein the first set of atomic deposition layers are deposited on the first plurality of carbonaceous particles consecutively.

30. The electrochemical storage device of claim 27, wherein at least one of the two or more first active materials comprise a metal oxide and wherein the metal oxide is selected from the group consisting essentially of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, and a mixture thereof.

31. The electrochemical storage device of claim 27, wherein the first and second active materials are substantially the same.

32. The electrochemical storage device of claim 27, wherein the first and second active materials are substantially different.

33. The electrochemical storage device of claim 27, wherein the electrolyte is selected from the group consisting essentially of an aqueous electrolyte, a non-aqueous electrolyte, an aprotic organic liquid electrolyte, a room temperature ionic liquid electrolyte, a polymeric electrolyte, a polymeric gel electrolyte, a solid-state electrolyte, and a mixture thereof.

34. The electrochemical storage device of claim 33, wherein the electrolyte further comprises an additive selected from the group consisting essentially of vinylene carbonate, fluoroethylene carbonate, and a mixture thereof.

35. The electrochemical storage device of claim 33, wherein the aprotic organic liquid electrolyte comprises an electrolyte salt and an aprotic organic solvent.

36. The electrochemical storage device of claim 35, wherein the electrolyte salt is quaternary salt and wherein the quaternary salt is selected from the group consisting essentially of tetraethylammonium tetrafluoroborate, triethylmethylammonium tetrafluoroborate, spirobipyrrolidinium tetrafluoroborate, and a mixture thereof.

37. The electrochemical storage device of claim 35, wherein the aprotic organic solvent is selected from the group consisting essentially of nitrile, carbonate, ester, ether, sulfone, acetal, and a mixture thereof.

* * * * *